US 9,459,872 B2

(12) United States Patent
Greiner et al.

(10) Patent No.: US 9,459,872 B2
(45) Date of Patent: *Oct. 4, 2016

(54) HIGH-WORD FACILITY FOR EXTENDING THE NUMBER OF GENERAL PURPOSE REGISTERS AVAILABLE TO INSTRUCTIONS

(71) Applicant: International Business Machines Corporation, Armonk, NY (US)

(72) Inventors: Dan F Greiner, San Jose, CA (US); Marcel Mitran, Markham (CA); Timothy J Slegel, Staatsburg, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/726,787

(22) Filed: Dec. 26, 2012

(65) Prior Publication Data

US 2013/0117545 A1    May 9, 2013

Related U.S. Application Data

(63) Continuation of application No. 12/820,735, filed on Jun. 22, 2010.

(51) Int. Cl.
    *G06F 9/30*    (2006.01)
    *G06F 9/32*    (2006.01)
    *G06F 9/34*    (2006.01)

(52) U.S. Cl.
    CPC .......... *G06F 9/3012* (2013.01); *G06F 9/30098* (2013.01); *G06F 9/30105* (2013.01); *G06F 9/30138* (2013.01); *G06F 9/30145* (2013.01); *G06F 9/30167* (2013.01);

(Continued)

(58) Field of Classification Search
    CPC .......... G06F 9/30105; G06F 9/30098; G06F 9/3012; G06F 9/30138; G06F 9/30145; G06F 9/3019
    USPC ........................................................ 712/220
    See application file for complete search history.

(56) References Cited

U.S. PATENT DOCUMENTS

| 5,551,013 A | 8/1996 | Beausoleil et al. |
| 5,574,873 A | 11/1996 | Davidian |

(Continued)

FOREIGN PATENT DOCUMENTS

| CN | 1226325 | 8/1999 |
| EP | 1462931 | 9/2004 |

(Continued)

OTHER PUBLICATIONS

IBM z/Architecture Principles of Operation, 8th Edition, Feb. 2009, SA22-7832-07.

(Continued)

*Primary Examiner* — Benjamin Geib
(74) *Attorney, Agent, or Firm* — William A. Kinnaman, Jr.

(57) ABSTRACT

A computer employs a set of General Purpose Registers (GPRs). Each GPR comprises a plurality of portions. Programs such as an Operating System and Applications operating in a Large GPR mode, access the full GPR, however programs such as Applications operating in Small GPR mode, only have access to a portion at a time. Instruction Opcodes, in Small GPR mode, may determine which portion is accessed.

19 Claims, 18 Drawing Sheets

(52) U.S. Cl.
CPC .......... *G06F 9/30189* (2013.01); *G06F 9/322* (2013.01); *G06F 9/342* (2013.01)

(56) References Cited

U.S. PATENT DOCUMENTS

| | | | |
|---|---|---|---|
| 5,751,614 A * | 5/1998 | Cohen | 708/231 |
| 5,790,825 A | 8/1998 | Traut | |
| 5,838,960 A | 11/1998 | Harriman, Jr. | |
| 5,881,259 A | 3/1999 | Glass | |
| 6,009,261 A | 12/1999 | Scalzi et al. | |
| 6,308,255 B1 | 10/2001 | Gorishek, IV et al. | |
| 6,343,356 B1 | 1/2002 | Pechanek et al. | |
| 6,463,582 B1 | 10/2002 | Lethin et al. | |
| 6,877,084 B1 * | 4/2005 | Christie | 712/203 |
| 7,284,092 B2 | 10/2007 | Nunamaker et al. | |
| 7,627,723 B1 | 12/2009 | Buck et al. | |
| 7,739,480 B2 | 6/2010 | Liao et al. | |
| 7,840,783 B1 | 11/2010 | Singh et al. | |
| 7,877,582 B2 * | 1/2011 | Gschwind et al. | 712/226 |
| 8,386,754 B2 * | 2/2013 | Blasco Allue et al. | 712/216 |
| 8,438,340 B2 | 5/2013 | Bohizic et al. | |
| 8,694,758 B2 * | 4/2014 | Orenstien et al. | 712/229 |
| 8,850,166 B2 | 9/2014 | Jacobi et al. | |
| 8,914,619 B2 | 12/2014 | Greiner et al. | |
| 2009/0249039 A1 | 10/2009 | Hook et al. | |
| 2010/0100692 A1 | 4/2010 | Mitran et al. | |
| 2011/0202748 A1 | 8/2011 | Jacobi et al. | |
| 2013/0117546 A1 | 5/2013 | Jacobi et al. | |

FOREIGN PATENT DOCUMENTS

| | | |
|---|---|---|
| JP | 05204635 | 8/1993 |
| JP | 06051981 | 2/1994 |
| JP | 7084839 | 3/1995 |
| JP | 2001501001 | 1/2001 |
| JP | 2004506263 | 2/2004 |
| JP | 2004355597 | 12/2004 |
| JP | 2006012163 | 1/2006 |
| KR | 20000048531 A1 | 7/2000 |
| KR | 20030024850 A1 | 3/2003 |
| WO | WO 98/12627 | 3/1998 |
| WO | WO0213005 A1 | 2/2002 |

OTHER PUBLICATIONS

International Search Report and Written Opinion mailed Feb. 1, 2011, PCT/EP2010/067048.

USPTO U.S. Appl. No. 12/820,735, filed Jun. 22, 2010 to Greiner et al, Office Action dated Jan. 3, 2014.

USPTO U.S. Appl. No. 12/820,735, filed Jun. 22, 2010 to Greiner et al, Office Action dated Sep. 14, 2013.

Intel M80C286 High Performance CHMOS Microprocessor with Memory Management and Protection, Feb. 1990.

Steve Furber, Revision: ARM Processor, CQ Publishing Co., ltd, Dec. 18, 2001, 1st Edition pp. 41-45; 187-189, 183-175; Abstract Only.

Zilog, z8000 Data Manual, CQ Publishing Co. Ltd, 1980 First Edition p. 26-47.

Intel Corporation Software Developer's Manual Basic Architecture; CQ Publishing Co., Ltd, 1987, pp. 2-1 through 2-3.

IBM z/Architecture Principles of Operation SA22-7832-06, 7th Edition, Feb. 2008, pp. 2-3; 2-4; 5-8 through 5-9; 7-202 through 7-203.

\* cited by examiner

E Format
501 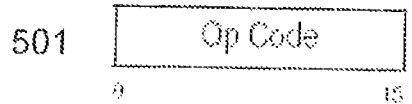
I Format
502 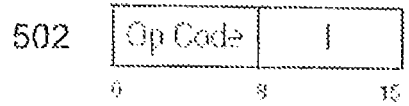
RI Format
503 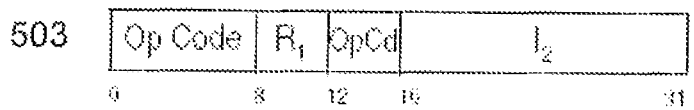
504 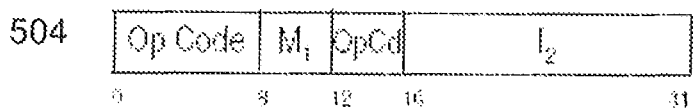
RIE Format
505 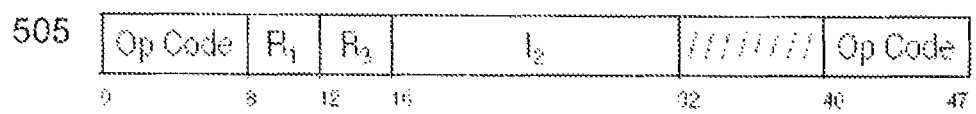
RIL Format
506 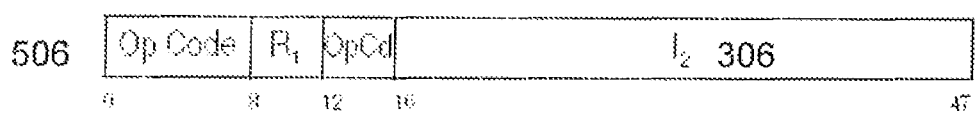
507 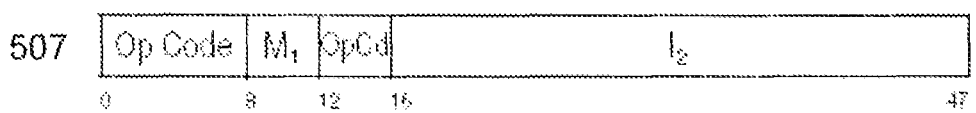
FIG. 9

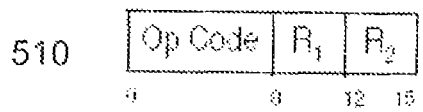
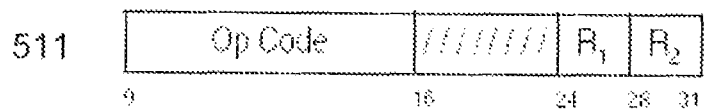
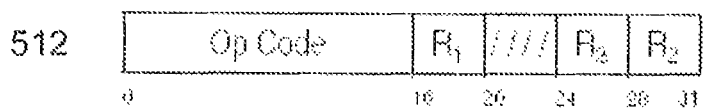
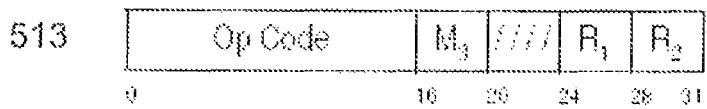
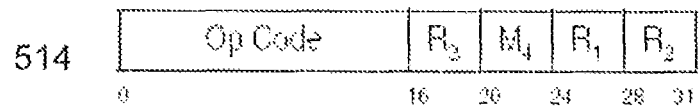
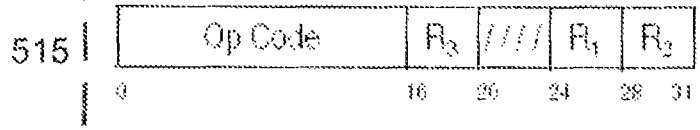
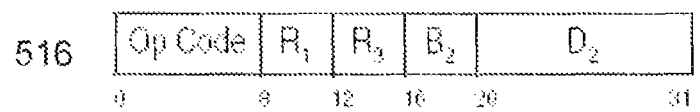
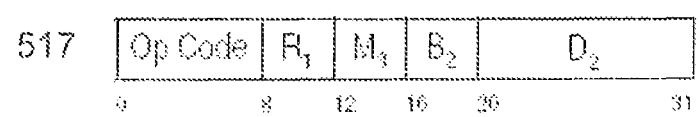
FIG. 10

RSI Format

520
| Op Code | $R_1$ | $R_3$ | $I_2$ |
|---|---|---|---|
| 0 | 8 | 12 | 16 ... 31 |

RSL Format

521
| Op Code | $L_1$ | //// | $B_1$ | $D_1$ | //////// | Op Code |
|---|---|---|---|---|---|---|
| 0 | 8 | 12 | 16 | 20 | 32 | 40 ... 47 |

RSY Format

522
| Op Code | $R_1$ | $R_3$ | $B_2$ | $DL_2$ | $DH_2$ | Op Code |
|---|---|---|---|---|---|---|
| 0 | 8 | 12 | 16 | 20 | 32 | 40 ... 47 |

523
| Op Code | $R_1$ | $M_3$ | $B_2$ | $DL_2$ | $DH_2$ | Op Code |
|---|---|---|---|---|---|---|
| 0 | 8 | 12 | 16 | 20 | 32 | 40 ... 47 |

RX Format

524
| Op Code | $R_1$ | $X_2$ | $B_2$ | $D_2$ |
|---|---|---|---|---|
| 0 | 8 | 12 | 16 | 20 ... 31 |

RXE Format

525
| Op Code | $R_1$ | $X_2$ | $B_2$ | $D_2$ | //////// | Op Code |
|---|---|---|---|---|---|---|
| 0 | 8 | 12 | 16 | 20 | 32 | 40 ... 47 |

RXF Format

526
| Op Code | $R_3$ | $X_2$ | $B_2$ | $D_2$ | $R_1$ | //// | Op Code |
|---|---|---|---|---|---|---|---|
| 0 | 8 | 12 | 16 | 20 | 32 | 36 | 40 ... 47 |

RXY Format

527
| Op Code | $R_1$ | $X_2$ | $B_2$ | $DL_2$ | $DH_2$ | Op Code |
|---|---|---|---|---|---|---|
| 0 | 8 | 12 | 16 | 20 | 32 | 40 ... 47 |

FIG. 11

S Format

530 | Op Code | B₂ | D₂ |
0······16··20······31

SI Format

531 | Op Code | I₂ | B₁ | D₁ |
0···8···16··20······31

SIY Format

532 | Op Code | I₂ | B₁ | DL₁ | DH₁ | Op Code |
0···8···16··20······32···40······47

SS Format

533 | Op Code | L | B₁ | D₁ | B₂ | D₂ |
0···8···16··20······32···36······47

534 | Op Code | L₁ | L₂ | B₁ | D₁ | B₂ | D₂ |
0···8···12···16··20······32···36······47

535 | Op Code | L₁ | I₃ | B₁ | D₁ | B₂ | D₂ |
0···8···12···16··20······32···36······47

536 | Op Code | R₁ | R₃ | B₁ | D₁ | B₂ | D₂ |
0···8···12···16··20······32···36······47

537 | Op Code | R₁ | R₃ | B₂ | D₂ | B₄ | D₄ |
0···8···12···16··20······32···36······47

FIG. 12

SSE Format

541 | Op Code | $B_1$ | $D_1$ | $B_2$ | $D_2$ |
0     16    20      32   36     47

SSF Format

542 | Op Code | $R_3$ | OpCd | $B_1$ | $D_1$ | $B_2$ | $D_2$ |
0    8    12   16   20    32   36     47

FIG. 13

RIE Format

551: | Op Code | R₁ | //// | I₂ | M₃ | //// | Op Code |
0  8  12  16  32  36  40  47

552: | Op Code | R₁ | R₂ | I₄ | M₃ | //// | Op Code |
0  8  12  16  32  36  40  47

553: | Op Code | R₁ | M₃ | I₄ | I₂ | Op Code |
0  8  12  16  32  40  47

554: | Op Code | R₁ | R₂ | I₃ | I₄ | I₅ | Op Code |
0  8  12  16  24  32  40  47

RIS Format

555: | Op Code | R₁ | M₃ | B₄ | D₄ | I₂ | Op Code |
0  8  12  16  20  32  40  47

SIL Format

556: | Op Code | B₁ | D₁ | I₂ |
0  16  20  32  47

FIG. 14

HIGH-WORD FACILITY FOR EXTENDING THE NUMBER OF GENERAL PURPOSE REGISTERS AVAILABLE TO INSTRUCTIONS

CROSS-REFERENCE TO RELATED APPLICATION

This is a Continuation Application of U.S. patent application Ser. No. 12/820,735 "HIGH-WORD FACILITY FOR EXTENDING THE NUMBER OF GENERAL PURPOSE REGISTERS AVAILABLE TO INSTRUCTIONS", Filed Jun. 22, 2010, which application is incorporated herein by reference.

FIELD OF THE INVENTION

The present invention is related to computer systems and more particularly to computer system processor instruction functionality.

BACKGROUND

Trademarks: IBM® is a registered trademark of International Business Machines Corporation, Armonk, N.Y., U.S.A. S/390, z900, z990 and z10 and other product names may be registered trademarks or product names of International Business Machines Corporation or other companies.

IBM has created through the work of many highly talented engineers beginning with machines known as the IBM® System 360 in the 1960s to the present, a special architecture which, because of its essential nature to a computing system, became known as "the mainframe" whose principles of operation state the architecture of the machine by describing the instructions which may he executed upon the "mainframe" implementation of the instructions which had been invented by IBM inventors and adopted, because of their significant contribution to improving the state of the computing machine represented by "the mainframe", as significant contributions by inclusion in IBM's Principles of Operation as stated over the years. The Eighth Edition of the IBM® z/Architecture® Principles of Operation which was published February, 2009 has become the standard published reference as SA22-7832-07 and is incorporated in IBM's z10® mainframe servers including the IBM System z10® Enterprise Class servers. The IBM Z/Architecture® Principles of Operation, Publication SA22-7832-07 is incorporated by reference in its entirety herein.

Referring to FIG. 1, representative components of a Host Computer system 50 are portrayed. Other arrangements of components may also he employed in a computer system, which are well known in the art. The representative Host Computer 50 comprises one or more CPUs 1 in communication with main store (Compute Memory 2) as well as I/O interfaces to storage devices 11 and networks 10 for communicating with other computers or SANs and the like. The CPU 1 is compliant with an architecture having an architected instruction set and architected functionality. The CPU 1 may have Dynamic Address Translation (DAT) 3 for transforming program addresses (virtual addresses) into real address of memory. A DAT typically includes a Translation Lookaside Buffer (TLB) 7 for caching translations so that later accesses to the block of computer memory 2 do not require the delay of address translation. Typically a cache 9 is employed between Computer Memory 2 and the Processor 1. The cache 9 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 2 by an instruction fetch unit 4 via a cache 9. The instruction is decoded in an instruction decode unit (6) and dispatched (with other instructions in some embodiments) to instruction execution units 8. Typically several execution units 8 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2, a load store unit 5 typically handles the access under control of the instruction being executed. Instructions may be executed in hardware circuits or in internal microcode (firmware) or by a combination of both.

In FIG. 2, an example of an emulated Host Computer system 21 is provided that emulates a Host computer system 50 of a Host architecture. In the emulated Host Computer system 21, the Host processor (CPU) 1 is an emulated Host processor (or virtual Host processor) and comprises an emulation processor 27 having a different native instruction set architecture than that of the processor 1 of the Host Computer 50. The emulated Host Computer system 21 has memory 22 accessible to the emulation processor 27. In the example embodiment, the Memory 27 is partitioned into a Host Computer Memory 2 portion and an Emulation Routines 23 portion. The Host Computer Memory 2 is available to programs of the emulated Host Computer 21 according to Host Computer Architecture. The emulation Processor 27 executes native instructions of an architected instruction set of an architecture other than that of the emulated processor 1, the native instructions obtained from Emulation Routines memory 23, and may access a Host instruction for execution from a program in Host Computer Memory 2 by employing one or more instructions obtained in a Sequence & Access/Decode routine which may decode the Host instruction(s) accessed to determine a native instruction execution routine for emulating the function of the Host instruction accessed. Other facilities that are defined for the Host Computer System 50 architecture may he emulated by Architected Facilities Routines, including such facilities as General Purpose Registers, Control Registers, Dynamic Address Translation I/O Subsystem support and processor cache for example. The Emulation Routines may also take advantage of function available in the emulation Processor 27 (such as general registers and dynamic translation of virtual addresses) to improve performance of the Emulation Routines. Special Hardware and Off-Load Engines may also be provided to assist the processor 27 in emulating the function of the Host Computer 50.

In a mainframe, architected machine instructions are used by programmers, usually today "C" programmers often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a Z/Architecture®, Linux can he used as well as machines which use emulation by Hercules, UMX, FSI (Fundamental Software, Inc) or Platform Solutions, Inc. (PSI), where generally execution is in an emulation mode. In emulation mode, emulation software is executed by a native processor to emulate the architecture of an emulated processor.

The native processor 27 typically executes emulation software 23 comprising either firmware or a native operating system to perform emulation of the emulated processor. The emulation software 23 is responsible for fetching and executing instructions of the emulated processor architecture. The emulation software 23 maintains an emulated program counter to keep track of instruction boundaries. The emulation software 23 may fetch one or more emulated machine instructions at a time and convert the one or more emulated machine instructions to a corresponding group of native machine instructions for execution by the native processor 27. These converted instructions may be cached such that a faster conversion can be accomplished. Not withstanding, the emulation software must maintain the architecture rules of the emulated processor architecture so as to assure operating systems and applications written for the emulated processor operate correctly. Furthermore the emulation software must provide resources identified by the emulated processor 1 architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine called to perform the function of the individual instruction. An emulation software function 23 emulating a function of an emulated. processor 1 is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013 for a "Multiprocessor for hardware emulation" of Beausoleil et al. and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582; Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; each of the above incorporated herein by reference in their entirety. These references illustrate a variety of known ways to achieve emulation of an instruction format architected for a different machine for a target machine available to those skilled in the art, as well as those commercial software techniques used by those referenced above.

What is needed is new instruction functionality consistent with existing architecture that relieves dependency on architecture resources such as general registers, improves functionality and performance of software versions employing the new instruction.

SUMMARY

In an embodiment of the High-word facility, an effective number of General Purpose Registers (GPRs) available to instructions of a program is extended in a computer having a first number of large GPRs, each instruction comprising an opcode and one or more GPR fields for specifying corresponding GPRs, each large GPR comprising a first portion and a second portion, said large GPRs comprising first small GPRs consisting of first portions and second small GPRs consisting of second portions, wherein responsive to the computer being in a small GPR mode, performing a) and b) are performed. a) instructions of a first set of instructions are executed, the first set of instructions for accessing said first small GPRs, the execution comprising generating memory addresses for accessing memory operands based on said first small GPRs or accessing first small GPR operands, wherein the first small GPRs consist of said first portions; and b) instructions of a second set of instructions are executed. the second set of instructions for accessing said second small GPRs, the execution comprising generating memory addresses for accessing memory operands based on said second small GPRs or accessing second small GPR operands, wherein the second small GPRs consist of said second portions; and responsive to the computer being in a large GPR mode, instructions of a third set of instructions are executed, the execution comprising generating memory addresses for accessing memory operands based on said large GPRs or accessing large GPR operands comprising said first portions and said second portions.

In an embodiment, the small GPR mode comprises being in one of a 24 bit addressing mode or a 31 bit addressing mode.

In an embodiment, the first portion is 32 bits, the second portion is 32 bits and the third portion is 64 bits.

In an embodiment, execution of the instruction of the second instruction set comprises performing a corresponding opcode defined function based on two operands, and storing the result, the corresponding opcode defined function consisting of an ADD of two operands function or a COMPARE of two operands function.

In an embodiment, execution of the instruction of the second instruction set comprises performing a corresponding opcode defined function based on two operands, and storing the result, the corresponding opcode defined function consists of a LOAD of an operand from memory function or a STORE of an operand to memory function.

In an embodiment, execution of the instruction of the second instruction set comprises performing a corresponding opcode defined function based on two operands, and storing the result, the corresponding opcode defined function is a ROTATE THEN INSERT SELECTED BITS function comprising:

rotating a source operand by an instruction specified amount; and inserting a selected portion of the rotated source operand in a selected portion of a target operand.

In an embodiment, an Operating System is supported operating in Large GPR mode wherein the Large GPRs are saved and restored during context switches for Applications running in Small GPR mode.

In an embodiment, an Operating System operates in Large GPR mode wherein the Large GPRs are saved and restored during context switches for Applications running in Small GPR mode.

The above as well as additional objectives, features, and advantages embodiments will become apparent in the following written description.

Other embodiments and aspects are described in detail herein and are considered a part of the claimed invention. For a better understanding of advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages are apparent from the following detailed description taken in conjunction with the accompanying drawings in which:

FIGS. 9-14 depict machine instruction format of a computer system;

DESCRIPTION

Figure 1:
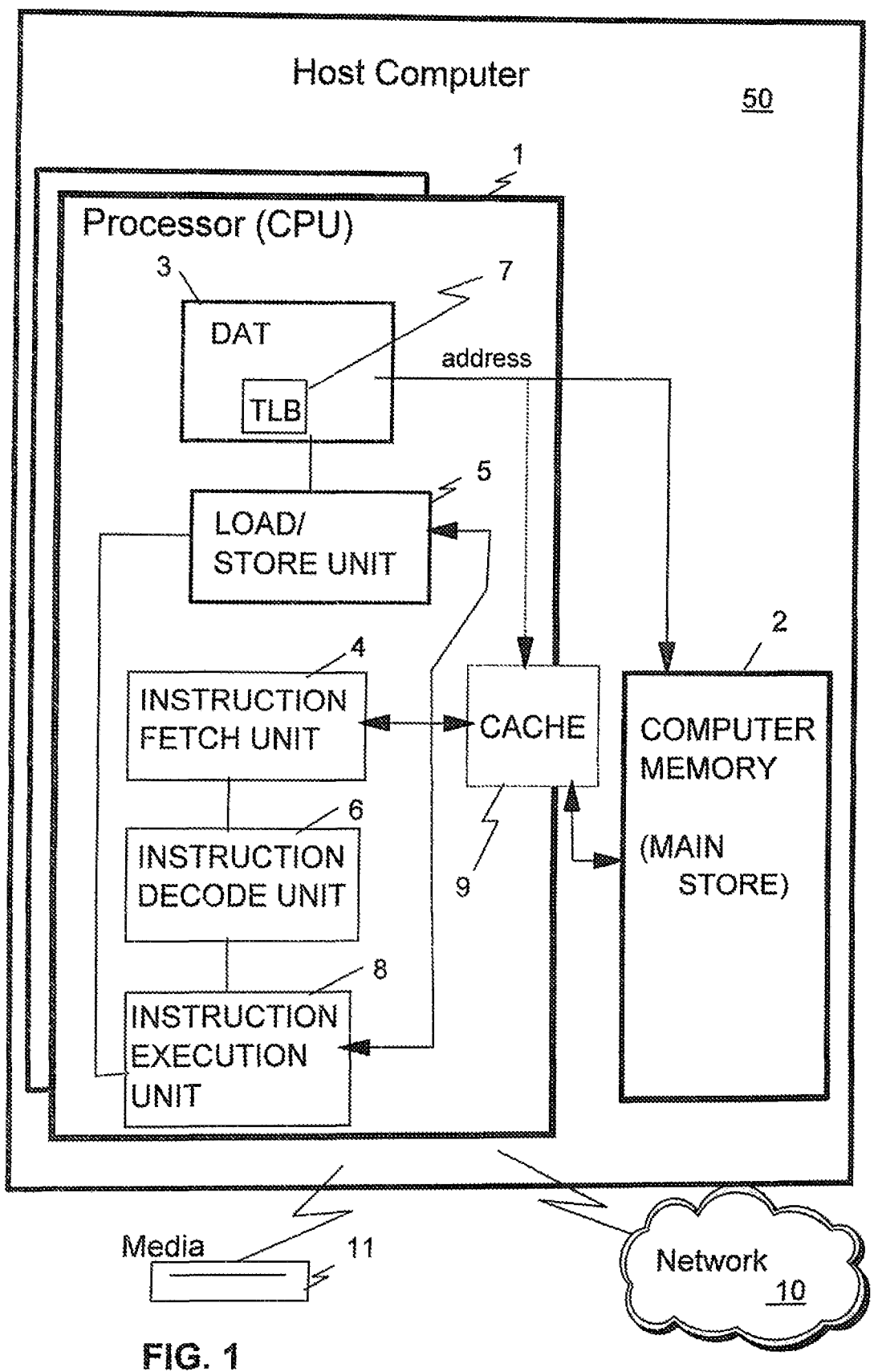
FIG. 1 is a diagram depicting an example Host computer system.
Figure 2:
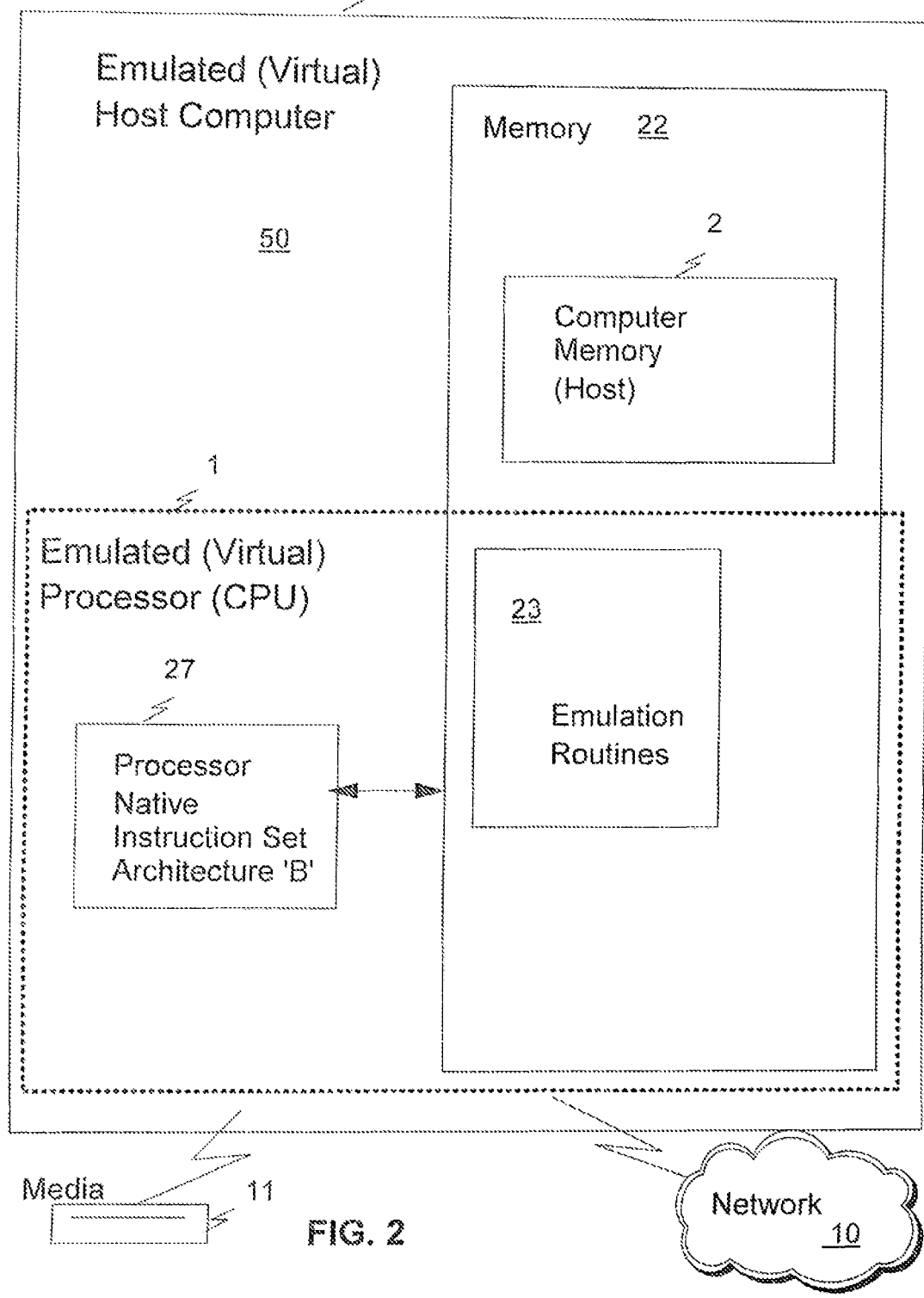
FIG. 2 is a diagram depicting an example emulation Host computer system.

An embodiment may be practiced by software (sometimes referred to Licensed Internal Code, Firmware, Micro-code, Milli-code, Pico-code and the like, any of which would be consistent with the embodiments). Referring to FIG. 1, software program code is typically accessed by the processor also known as a CPU (Central Processing Unit) 1 of the system 50 from long-term storage media 11, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2 or storage of one computer system over a network 10 to other computer systems for use by users of such other systems.

Alternatively, the program code may he embodied in the memory 2, and accessed by the processor 1 using the processor bus. Such program code includes an operating system which controls the function and interaction of the various computer components and one or more application programs. Program code is normally paged from dense storage media 11 to high-speed memory 2 where it is available for processing by the processor 1. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 3:
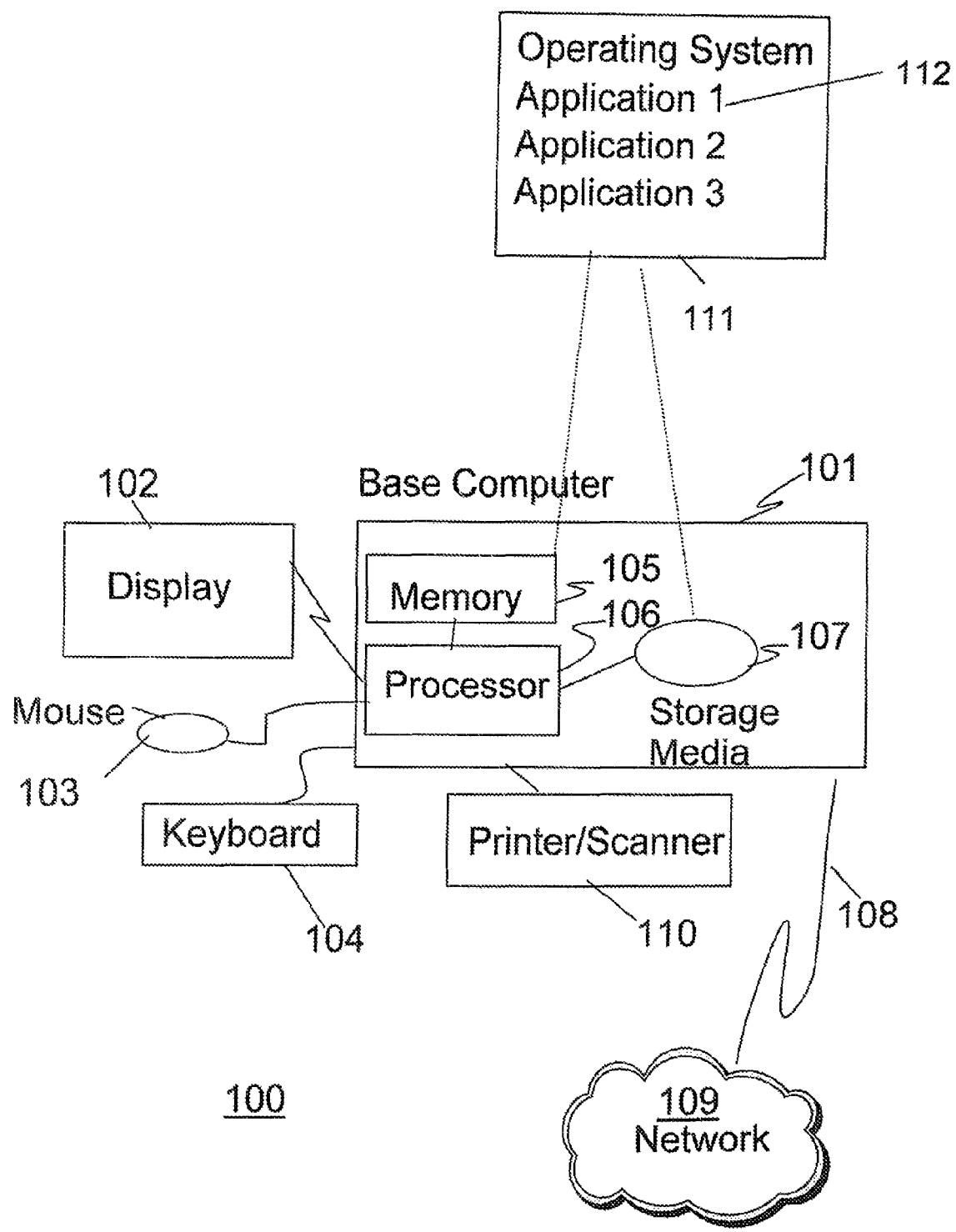
FIG. 3 is a diagram depicting an example computer system.

FIG. 3 illustrates a representative workstation or server hardware system. The system 100 of FIG. 1C comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive (including any of magnetic media, CD, DVD and Flash Memory for example) or a tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating 108 with a network 109. Example network adapters are communications channels, token ring, Ethernet or modems. Alternatively, the workstation 101 may communicate using: a wireless interface, such as a CDPD (cellular digital packet data) card. The workstation 101 may be associated with such other computers in a Local Area Network (LAN) or a Wide Area Network (WAN), or the workstation 101 can be a client in a client/serve arrangement with another computer, etc. All of these configurations, as well as the appropriate communications hardware and software, are known in the art.

Figure 4:
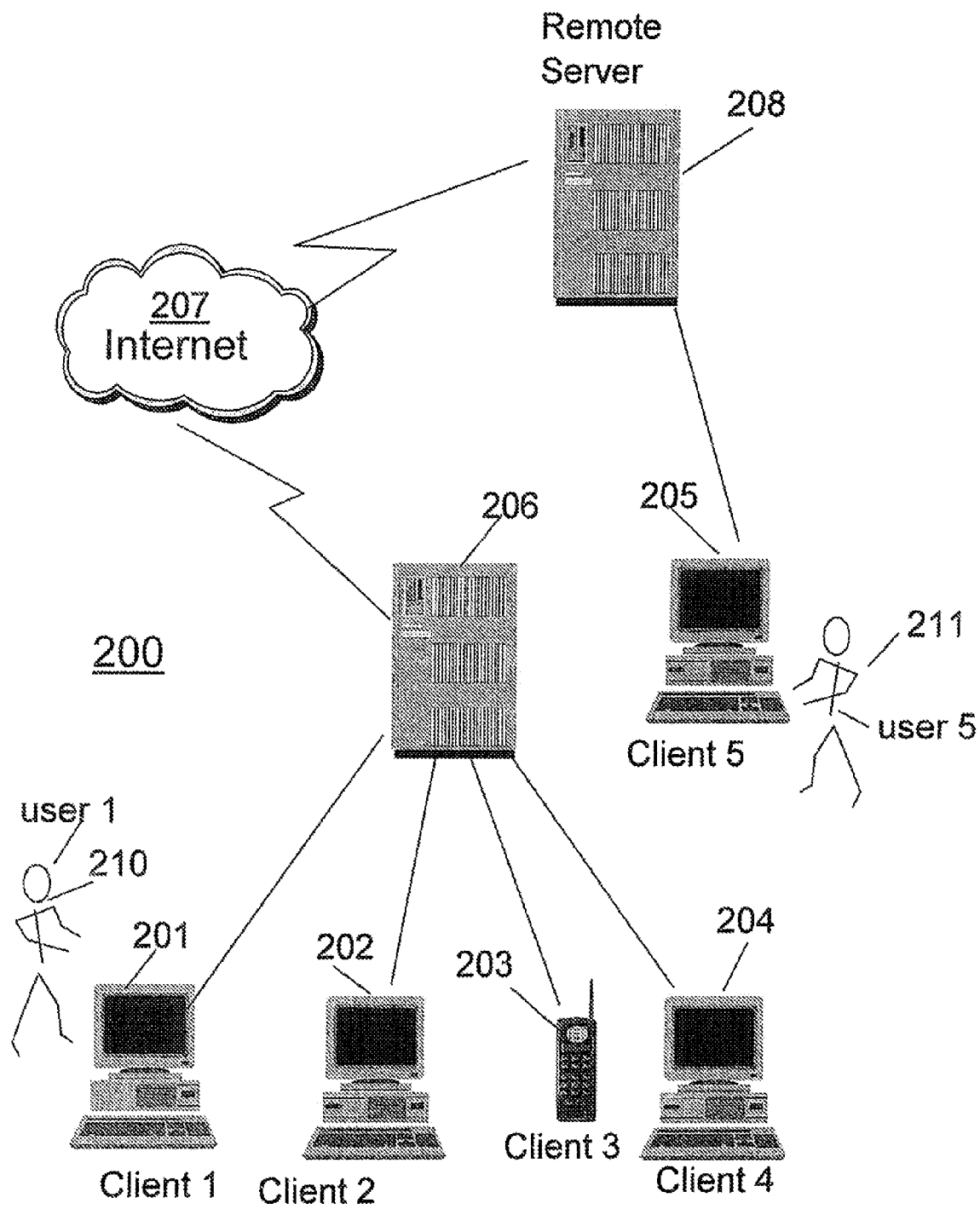
FIG. 4 is a diagram depicting an example computer network.

FIG. 4 illustrates a data processing network 200 in which embodiments may be practiced. The data processing network 200 may include a plurality of individual networks, such as a wireless network and a wired network, each of which may include a plurality of individual workstations 101 201 202 203 204. Additionally, as those skilled in the art will appreciate, one or more LANs may be included, where a LAN may comprise a plurality of intelligent workstations coupled to a host processor.

Still referring to FIG. 4, the networks may also include mainframe computers or servers, such as a gateway computer (client server 206) or application server (remote server 208 which may access a data repository and may also be accessed directly from a workstation 205). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 201 202 203 204 using a communications link. The gateway computer may be implemented utilizing an IBM eServer™ zSeries® z9® Server available from IBM Corp.

Software programming code is typically accessed by the processor 106 of the system 101 from long-term storage media 107. such as a CD-ROM drive or hard drive. The software programming code may be embodied on any of a variety of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high-speed memory 105 where it is available for processing by the processor 106. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs). DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 5:
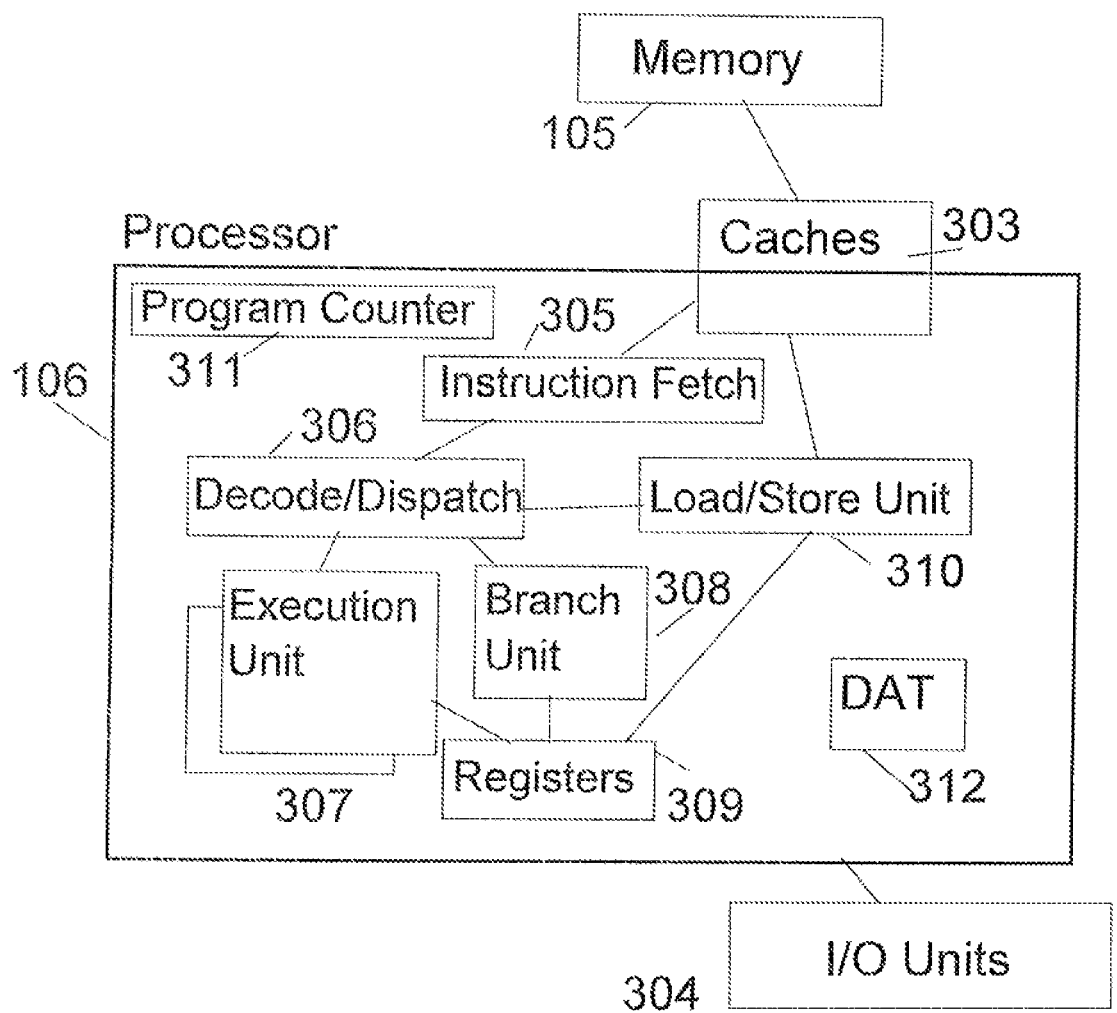
FIG. 5 is a diagram depicting an elements of a computer system.

Referring to FIG. 5, an exemplary processor embodiment is depicted for processor 106. Typically one or more levels of Cache 303 are employed to buffer memory blocks in order to improve processor performance. The cache 303 is a high speed buffer holding cache lines of memory data that are likely to he used. Typical cache lines are 64, 128 or 256 bytes of memory data. Separate Caches are often employed for caching instructions than for caching data. Cache coherence (synchronization of copies of lines in Memory and the Caches) is often provided by various "Snoop" algorithms well known in the art. Main storage 105 of a processor system is often referred to as a cache. In a processor system having 4 levels of cache 303 main storage 105 is sometimes referred to as the level 5 (L5) cache since it is typically faster and only holds a portion of the non-volatile storage (DASD, Tape etc) that is available to a computer system. Main storage 105 "caches" pages of data paged in and out of the main storage 105 by the Operating system.

A program counter (instruction counter) 311 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the Operating system environment). The PSW of the program maintains the program counter value while the program is not active, and the program counter (in the PSW) of the operating system is used while the operating system is executing. Typically the Program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 311 is modified by either a context switch operation or a Branch taken operation of a Branch instruction for example. In a context switch operation, the current program counter value is saved in a Program Status Word (PSW) along with other state information about the program being executed (such as condition codes), and a new program counter value is loaded pointing to an instruction of a new program module to be executed. A branch taken operation is performed in order to permit the program to make decisions or loop within the program by loading the result of the Branch Instruction into the Program Counter 311.

Typically an instruction Fetch Unit 305 is employed to fetch instructions on behalf of the processor 106. The fetch unit either fetches "next sequential instructions", target instructions of Branch Taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 106. In an embodiment, the fetched instruction(s) are passed to a dispatch unit 306 of the fetch unit. The dispatch unit decodes the instruction(s) and forwards information about the decoded instruction(s) to appropriate units 307 308 310. An execution unit 307 will typically receive information about decoded arithmetic instructions from the instruction fetch unit 305 and will perform arithmetic operations on operands according to the opcode of the instruction. Operands are provided to the execution unit 307 preferably either from memory 105, architected registers 309 or from an immediate field of the instruction being executed. Results of the execution, when stored, are stored either in memory 105, registers 309 or in other machine hardware such as control registers, PSW registers and the like).

Figure 6:
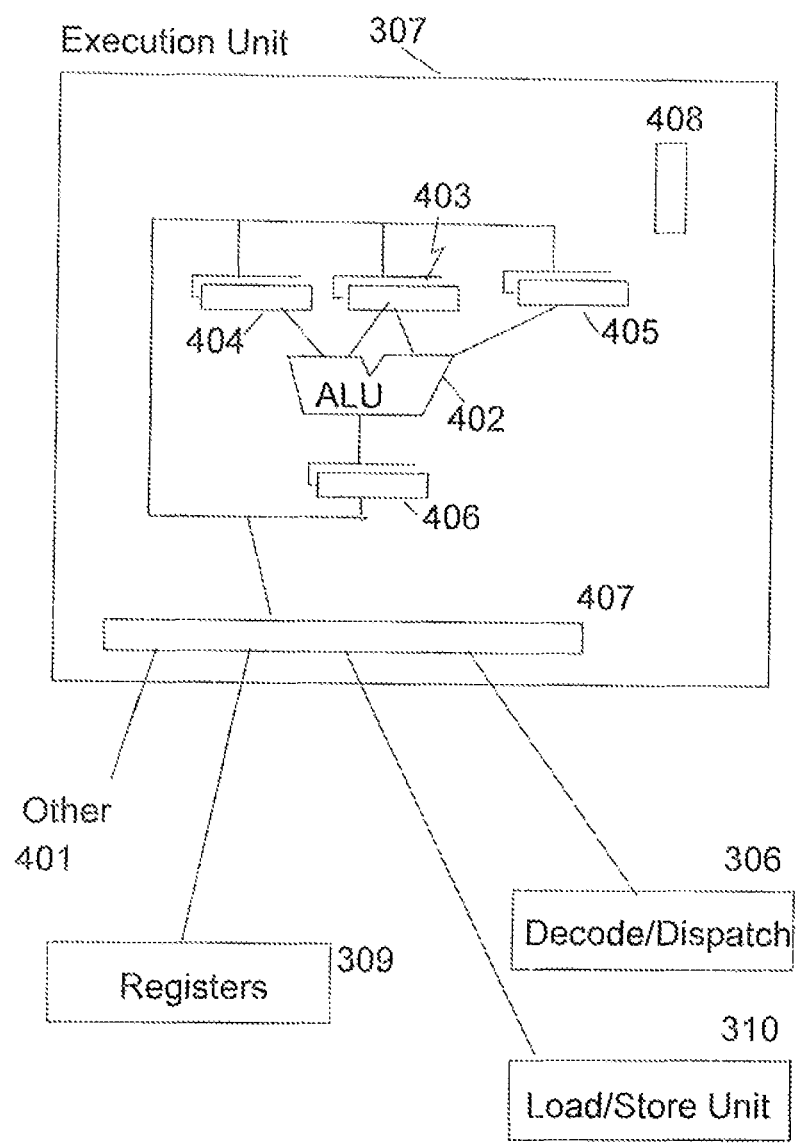
FIGS. 6-8 depict detailed elements of a computer system.

A processor 106 typically has one or more execution units 307 308 310 for executing the function of the instruction. Referring to FIG. 6, an execution unit 307 may communicate with architected general registers 309, a decode/dispatch unit 306 a load store unit 310 and other 401 processor units by way of interlacing logic 407. An Execution unit 307 may employ several register circuits 403 404 405 to hold information that the arithmetic logic unit (ALU) 402 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 408 including condition codes and recovery support logic for example. Typically the result of an ALU operation is held in an output register circuit 406 which can forward the result to a variety of other processing functions. There are many arrangements of processor units, the present description is only intended to provide a representative understanding of one embodiment.

An ADD instruction for example would be executed in an execution unit 307 having arithmetic and logical functionality while a Floating Point instruction for example would be executed in a floating Point Execution having specialized Floating Point capability. Preferably, an execution unit operates on operands identified by an instruction by performing an opcode defined function on the operands. For example, an ADD instruction may be executed by an execution unit 307 on operands found in two registers 309 identified by register fields of the instruction.

The execution unit 307 performs the arithmetic addition on two operands and stores the result in a third operand where the third operand may be a third register or one of the two source registers. The Execution unit preferably utilizes an Arithmetic Logic Unit (ALU) 402 that is capable of performing a variety of logical functions such as Shift, Rotate, And, Or and XOR as well as a variety of algebraic functions including any of add, subtract, multiply, divide. Some ALUs 402 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only and addition within the ALU. Numbers are commonly described in shorthand, where a 12 bit field defines an address of a 4,096 byte block and is commonly described as a 4 Kbyte (Kilo-byte) block for example.

Trimodal Addressing

"Trimodal addressing" refers to the ability to switch between the 24-bit, 31-bit, and 64-bit addressing modes. This switching can be done by means of:

The old instructions BRANCH AND SAVE AND SET MODE and BRANCH AND SET MODE. Both of these instructions set the 64-bit addressing mode if bit 63 of the R2 general register is one. If bit 63 is zero, the instructions set the 24-bit or 31-bit addressing mode if bit 32 of the register is zero or one, respectively.

The new instruction SET ADDRESSING MODE (SAM24, SAM31, and SAM64).

The instruction sets the 24-bit, 31-bit, or 64-bit addressing mode as determined by the operation code.

Tri-Modal Instructions

Trimodal addressing affects the general instructions only in the manner in which logical storage addresses are handled, except as follows.

The instructions BRANCH AND LINK, BRANCH AND SAVE, BRANCH AND SAVE AND SET MODE, BRANCH AND SET MODE, and BRANCH RELATIVE AND SAVE place information in bit positions 32-39 of general register R1 as in ESA/390 in the 24-bit or 31-bit addressing mode or place address bits in those bit positions in the 64-bit addressing mode. The new instruction BRANCH RELATIVE AND SAVE LONG does the same.

The instructions BRANCH AND SAVE AND SET MODE and BRANCH AND SET MODE, place a one in bit position 63 of general register R1 in the 64-bit addressing mode. In the 24-bit or 31-bit mode, BRANCH AND SAVE AND SET MODE sets bit 63 to zero, and BRANCH AND SET MODE leaves it unchanged.

Certain instructions leave bits 0-31 of a general register unchanged in the 24-bit or 31-bit addressing mode but place or update address or length information in them in the 64-bit addressing mode. These are listed in programming note 1 on page 7-7 and are sometimes called modal instructions.

Effects on Bits 0-31 of a General Register:

Bits 0-31 of general registers are changed by two types of instructions. The first type is a modal instruction (see the preceding section) when the instruction is executed in the 64-bit addressing mode. The second type is an instruction having, independent of the addressing mode, either a 64-bit result operand in a single general register or a 128-bit result operand in an even-odd general-register pair. Most of the instructions of the second type are indicated by a "G," either alone or in "GF," in their mnemonics. All of the instructions of the second type are sometimes referred to as "G-type" instructions. If a program is not executed in the 64-bit addressing mode (Large GPR mode) and does not contain a G-type instruction, it cannot change bits 0-31 of any general register (Small GPR mode). In some environments, a portion of an application program may be in Small GPR mode and another portion may be in Large GPR mode. In an embodiment, certain instructions may be Small GPR mode instructions and others may be Large GPR mode instructions, wherein the mode of the computer is dependent on whether it is executing a Small GPR mode instruction or a Large GPR mode instruction.

Figure 7:
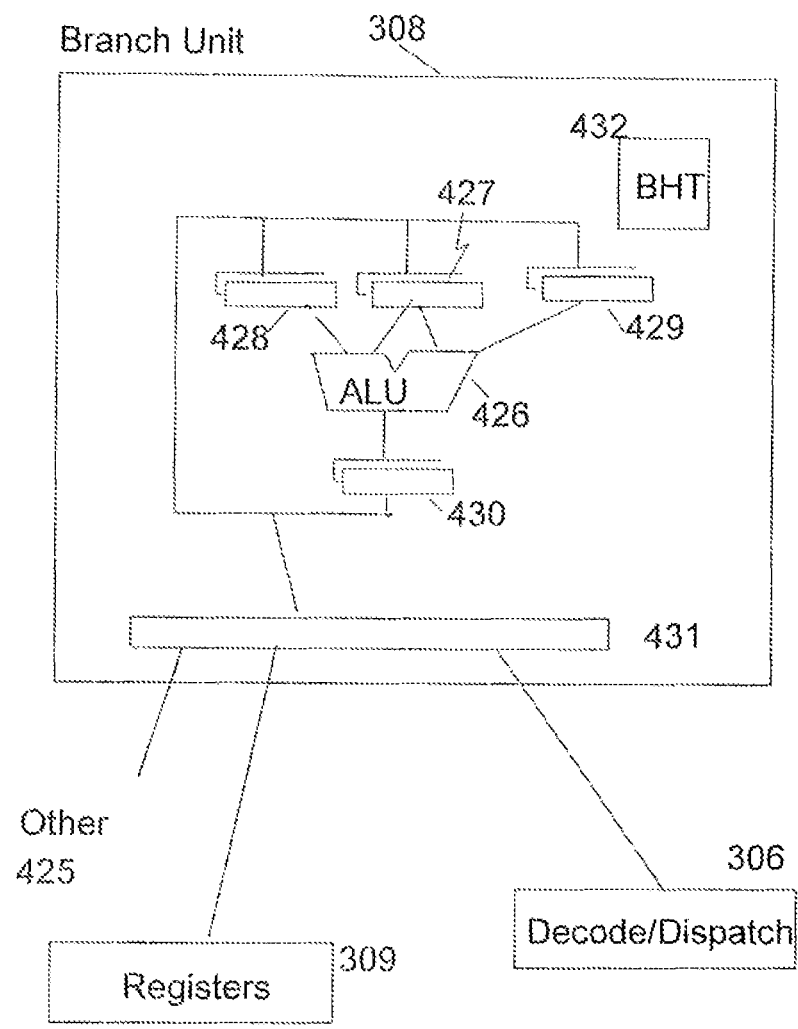

Referring to FIG. 7, Branch instruction information for executing a branch instruction is typically sent to a branch unit 308 which often employs a branch prediction algorithm such as a branch history table 432 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 308 may employ an ALU 426 having a plurality of input register circuits 427 428 429 and an output register circuit 430. The branch unit 308 may communicate with general registers 309, decode dispatch unit 306 or other circuits 425 for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment) for example. Preferably a context switch action saves state information about a currently executing program and then loads state information about another program being invoked. State information may he saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pica-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a Base register, an Index register and an immediate field (displacement field) that are added together to provide the address of the operand in memory for example. Location herein typically implies a location in main memory (main storage) unless otherwise indicated.

Figure 8:
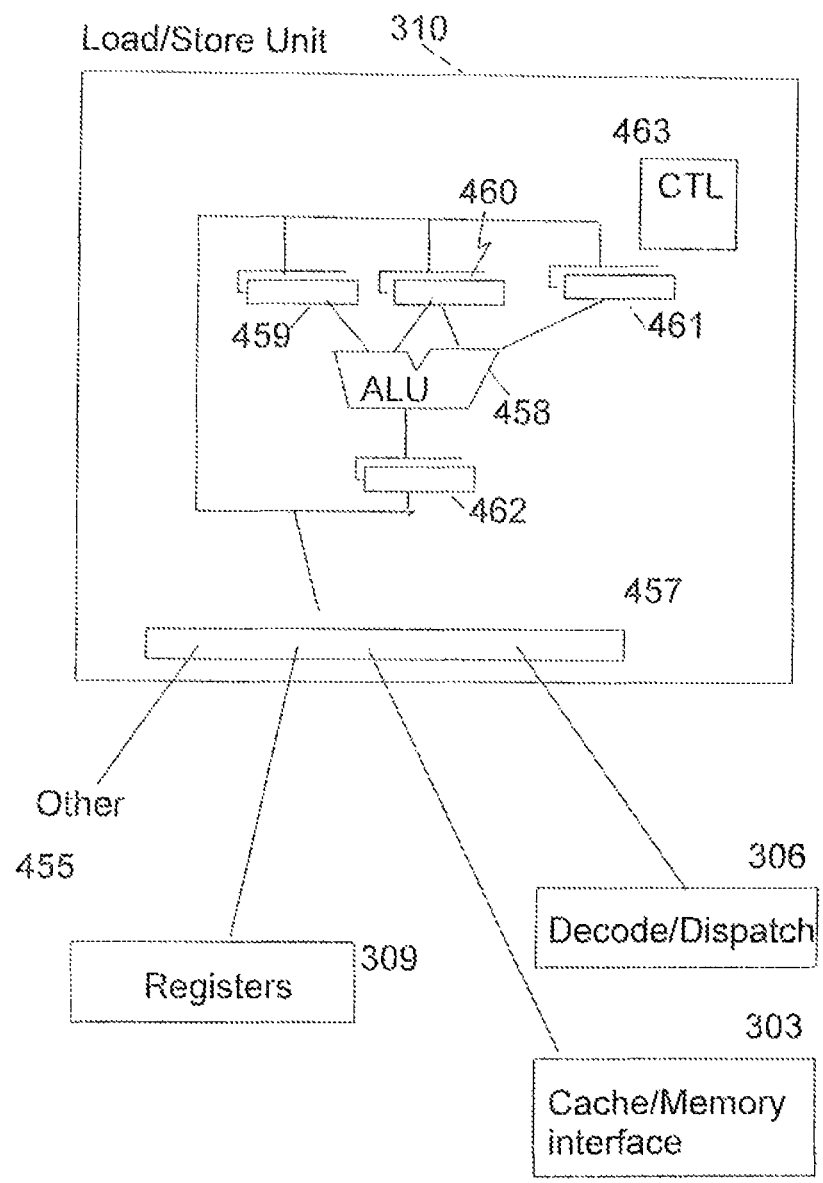

Referring to FIG. 8, a processor accesses storage using a Load/Store unit 310. The Load/Store unit 310 may perform a Load operation by obtaining the address of the target operand in memory 303 and loading the operand in a register 309 or another memory 303 location, or may perform a Store operation by obtaining the address of the target operand in memory 303 and storing data obtained from a register 309 or another memory 303 location in the target operand location in memory 303. The Load/Store unit 310 may be speculative and may access memory in a sequence that is out-of-order relative to instruction sequence, however the Load/Store unit 310 must maintain the appearance to programs that instructions were executed in order. A load/store unit 310 may communicate with general registers 309, decode/dispatch unit 306, Cache/Memory interface 303 or other elements 455 and comprises various register circuits, ALUs 458 and control logic 463 to calculate storage addresses and to provide pipeline sequencing to keep operations in-order. Some operations may be out of order but the Load/Store unit provides functionality to make the out of order operations to appear to the program as having been performed in order as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of Dynamic Address Translation (DAT) 312 technologies including, but not limited to simply prefixing a virtual address with an offset value, translating the virtual address via one or more translation tables, the translation tables preferably comprising at least a segment table and a page table alone or in combination, preferably, the segment table having an entry pointing to the page table. In z/Architecture, a hierarchy of translation is provided including a region first table, a region second table, a region third table, a segment table and an optional page table. The performance of the address translation is often improved by utilizing a Translation Look-aside Buffer (TLB) which comprises entries mapping a virtual address to an associated physical memory location. The entries are created when DAT 312 translates a virtual address using the translation tables. Subsequent use of the virtual address can then utilize the entry of the fast TLB rather than the slow sequential Translation table accesses. TLB content may be managed by a variety of replacement algorithms including LRU (Least Recently used).

In the case where the Processor is a processor of a multi-processor system, each processor has responsibility to keep shared resources such as I/O, caches, TLBs and Memory interlocked for coherency. Typically "snoop" technologies will be utilized in maintaining cache coherency. In a snoop environment, each cache line may be marked as being in any one of a shared state, an exclusive state, a changed state, an invalid state and the like in order to facilitate sharing.

I/O units 304 provide the processor with means for attaching to peripheral devices including Tape, Disc, Printers, Displays, and networks for example. I/O units are often presented to the computer program by software Drivers. In Mainframes such as the z/Series from IBM, Channel Adapters and Open System Adapters are I/O units of the Mainframe that provide the communications between the operating system and peripheral devices.

The following description from the z/Architecture Principles of Operation describes an architectural view of a computer system:

Storage:

A computer system includes information in main storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs must be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE Instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, a group of bytes in storage is addressed by the leftmost byte of the group. The number of bytes in the group is either implied or explicitly specified by the operation to be performed, When used in a CPU operation, a group of bytes is called a field. Within each group of bytes, bits are numbered in a left-to-right sequence. The leftmost bits are sometimes referred to as the "high-order" bits and the rightmost bits as the "low-order" bits. Bit numbers are not storage addresses, however. Only bytes can be addressed. To operate on individual bits of a byte in storage, it is necessary to access the entire byte. The bits in a byte are numbered 0 through 7, from left to right. The bits in an address may be numbered 8-31 or 40-63 for 24-bit addresses or 1-31 or 33-63 for 31-bit addresses: they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte. When information is placed in storage, the contents of only those byte locations are replaced that are included in the designated field, even though the width of the physical path to storage may be greater than the length of the field being stored.

Certain units of information must be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions must be on two-byte integral boundaries. The storage operands of most instructions do not have boundary-alignment requirements.

On models that implement separate caches for instructions and data operands, a significant delay may be experienced if the program stores into a cache line from which instructions are subsequently fetched, regardless of whether the store alters the instructions that are subsequently fetched.
Instructions:

Typically, operation of the CPU is controlled by instructions in storage that are executed sequentially, one at a time, left to right in an ascending sequence of storage addresses. A change in the sequential operation may be caused by branching, LOAD PSW, interruptions, SIGNAL PROCESSOR orders, or manual intervention.

Preferably an instruction comprises two major parts:

An operation code (op code), which specifies the operation to be performed

Optionally, the designation of the operands that participate.

Instruction formats of the z/Architecture are shown in FIGS. 9-14. An instruction can simply provide an Opcode 501, or an opcode and a variety of fields including immediate operands or register specifiers for locating operands in registers or in memory. The Opcode can indicate to the hardware that implied resources (operands etc) are to be used such as one or more specific general purpose registers (GPRs). Operands can be grouped in three classes: operands located in registers, immediate operands, and operands in storage. Operands may be either explicitly or implicitly designated. Register operands can be located in general, floating-point, access, or control registers, with the type of register identified by the op code. The register containing the operand is specified by identifying the register in a four-bit field, called the R field, in the instruction. For some instructions, an operand is located in an implicitly designated register, the register being implied by the op code. Immediate operands are contained within the instruction, and the 8-bit, 16-bit, or 32-bit field containing the immediate operand is called the I field. Operands in storage may have an implied length; be specified by a bit mask; be specified by a four-bit or eight-bit length specification, called the L field, in the instruction; or have a length specified by the contents of a general register. The addresses of operands in storage are specified by means of a format that uses the contents of a general register as part of the address. This makes it possible to:

1. Specify a complete address by using an abbreviated notation
2. Perform address manipulation using instructions which employ general registers for operands
3. Modify addresses by program means without alteration of the instruction stream
4. Operate independent of the location of data areas by directly using addresses received from other programs The address used to refer to storage either is contained in a register designated by the R field in the instruction or is calculated from a base address, index, and displacement, specified by the B, X, and D fields, respectively, in the instruction. When the CPU is in the access-register mode, a B or R field may designate an access register in addition to being used to specify an address. To describe the execution of instructions, operands are preferably designated as first and second operands and, in some cases, third and fourth operands. In general, two operands participate in an instruction execution, and the result replaces the first operand.

An instruction is one, two, or three halfwords in length and must be located in storage on a halfword boundary. Referring to FIGS. 9-14 depicting instruction formats, each instruction is in one of 25 basic formats; E 501, I 502, RI 503 504, RIE 505 551 552 553 554, RIL 506 507, RIS 555, RR 510, RRE 511, RRF 512 513 514, RRS, RS 516 517, RSI 520, RSL 521, RSY 522 523, RX 524, RXE 525, RXF 526, RXY 527, S 530, SI 531, SIL 556, SIY 532, SS 533 534 535 536 537, SSE 541 and SSF 542, with three variations of RRF, two of RI, RIL, RS, and RSY, five of RIE and SS.

The format names indicate, in general terms, the classes of operands which participate in the operation and some details about fields:

RIS denotes a register-and-immediate operation and a storage operation.

RRS denotes a register-and-register operation and a storage operation.

SIL denotes a storage-and-immediate operation, with a 16-bit immediate field.

In the I, RR, RS, RSI, RX, SI, and SS formats, the first byte of an instruction contains the op code. In the E, RRE, RRF, S, SIL, and SSE formats, the first two bytes of an instruction contain the op code, except that for some instructions in the S format, the op code is in only the first byte. In the RI and RIL formats, the op code is in the first byte and bit positions 12-15 of an instruction. In the RIE, RIS, RRS, RSL, RSY, RXE, RSF, and STY formats, the op code is in the first byte and the sixth byte of an instruction. The first two bits of the first or only byte of the op code specify the length and format of the instruction, as follows:

In the RR, RRE, RRF, RRR, RX, RXE, RXF, RXY, RS, RSY, RSI RI, RIE, and RIL formats, the contents of the register designated by the R1. field are called the first operand. The register containing the first operand is sometimes referred to as the "first operand location," and sometimes as "register R1". In the RR, RRE, RRF and RRR formats, the R2 field designates the register containing the second operand, and the R2 field may designate the same register as R1. In the RFF, RXF, RS, RSY, RSI, and RIE formats, the use of the R3 field depends on the instruction. In the RS and RSY formats, the R3 field may instead be an M3 field specifying a mask. The R field designates a general or access register in the general instructions, a general register in the control instructions, and a floating-point register or a general register in the floating-point instructions. For general and control registers, the register operand is in bit positions 32-63 of the 64-bit register or occupies the entire register, depending on the instruction, In the I format, the contents of the eight-bit immediate-data field, the I field of the instruction. are directly used as the operand. In the SI format, the contents of the eight-bit immediate-data field, the I2 field of the instruction, are used directly as the second operand. The B1 and D1 fields specify the first operand, which is one byte in length. In the STY format, the operation is the same except that DH1 and DL1 fields me used instead of a D1 field. In the RI format for the instructions ADD HALFWORD IMMEDIATE, COMPARE HALFWORD IMMEDIATE, LOAD HALFWORD IMMEDIATE, and MULTIPLY HALFWORD IMMEDIATE, the contents of the 16-bit I2 field of the instruction are used directly as a signed binary integer, and the R1 field specifies the first operand, which is 32 or 64 bits in length, depending on the instruction. For the instruction TEST UNDER MASK (TMHH, TMHL, TMLH, TMLL), the contents of the I2 field are used as a mask, and the R1 field specifies the first operand, which is 64 bits in length.

For the instructions INSERT IMMEDIATE, AND IMMEDIATE, OR IMMEDIATE, and LOAD LOGICAL IMMEDIATE, the contents of the I2 field are used as an unsigned binary integer or a logical value, and the R1 field specifies the first operand, which is 64 bits in length. For the relative-branch instructions in the RI and RSI formats, the contents of the 16-bit I2 field are used as a signed binary integer designating a number of halfwords. This number, when added to the address of the branch instruction, specifies the branch address. For relative-branch instructions in the RIL format, the I2 field is 32 bits and is used in the same way.

For the relative-branch instructions in the RI and RSI formats, the contents of the 16-bit I2 field are used as a signed binary integer designating a number of halfwords. This number, when added to the address of the branch instruction, specifies the branch address. For relative-branch instructions in the RIL format, the I2 field is 32 bits and is used in the same way. For the RIE-format instructions COMPARE IMMEDIATE AND BRANCH RELATIVE and COMPARE LOGICAL IMMEDIATE AND BRANCH RELATIVE, the contents of the 8-bit I2 field is used directly as the second operand. For the RIE-format instructions COMPARE IMMEDIATE AND BRANCH, COMPARE IMMEDIATE AND TRAP, COMPARE LOGICAL IMMEDIATE AND BRANCH, and COMPARE LOGICAL IMMEDIATE AND TRAP, the contents of the 16-bit I2 field are used directly as the second operand. For the RIE-format instructions COMPARE AND BRANCH RELATIVE, COMPARE IMMEDIATE AND BRANCH RELATIVE, COMPARE LOGICAL AND BRANCH RELATIVE, and COMPARE LOGICAL IMMEDIATE AND BRANCH RELATIVE, the contents of the 16-bit 14 field are used as a signed binary integer designating a number of halfwords that are added to the address of the instruction to form the branch address.

For the RIL-format instructions ADD IMMEDIATE, ADD LOGICAL IMMEDIATE, ADD LOGICAL WITH SIGNED IMMEDIATE, COMPARE IMMEDIATE, COMPARE LOGICAL IMMEDIATE, LOAD IMMEDIATE, and MULTIPLY SINGLE IMMEDIATE, the contents of the 32-bit I2 field are used directly as a the second operand.

For the RIS-format instructions, the contents of the 8-bit I2 field are used directly as the second operand. In the SIL format, the contents of the 16-bit I2 field are used directly as the second operand. The B1 and D1 fields specify the first operand, as described below.

In the RSL, SI, SIL, SSE, and most SS formats, the contents of the general register designated by the B1 field are added to the contents of the D1 field to form the first-operand address. In the RS, RSY, S, SIY, SS, and SSE formats, the contents of the general register designated by the B2 field are added to the contents of the D2 field or DH2 and DL2 fields to form the second-operand address. In the RX, RXE, RXF, and RXY formats, the contents of the general registers designated by the X2 and B2 fields are added to the contents of the D2 field or DH2 and DL2 fields to form the second-operand address. In the RIS and RRS formats, and in one SS format, the contents of the general register designated by the B4 field are added to the contents of the D4 field to form the fourth-operand address.

In the SS format with a single, eight-bit length field, for the instructions AND (NC), EXCLUSIVE OR (XC), MOVE (MVC), MOVE NUMERICS, MOVE ZONES, and OR (OC), L specifies the number of additional operand bytes to the right of the byte designated by the first-operand address. Therefore, the length in bytes of the first operand is 1-256, corresponding to a length code in L of 0-255. Storage results replace the first, operand and are never stored outside the field specified by the address and length. In this format, the second operand has the same length as the first operand. There are variations of the preceding definition that apply to EDIT, EDIT AND MARK, PACK ASCII, PACK UNICODE, TRANSLATE, TRANSLATE AND TEST, UNPACK ASCII, and UNPACK UNICODE.

In the SS format with two length fields, and in the RSL format, L1 specifies the number of additional operand bytes to the right of the byte designated by the first-operand. address. Therefore, the length in bytes of the first operand is 1-16, corresponding to a length code in L1 of 0-15. Similarly, L2 specifies the number of additional operand bytes to the right of the location designated by the second-operand address Results replace the first operand and are never stored outside the field specified by the address and length. If the first operand is longer than the second, the second operand is extended on the left with zeros up to the length of the first operand. This extension does not modify the second operand in storage. In the SS format with two R fields, as used by the MOVE TO PRIMARY, MOVE TO SECONDARY, and MOVE WITH KEY instructions, the contents of the general register specified by the R1 field are a 32-bit unsigned value called the true length. The operands are both of a length called the effective length. The effective length is equal to the true length or 256, whichever is less. The instructions set the condition code to facilitate programming a loop to move the total number of bytes specified by the true length. The SS format with two R fields is also used to specify a range of registers and two storage operands for the LOAD MULTIPLE DISJOINT instruction and to specify one or two registers and one or two storage operands for the PERFORM LOCKED OPERATION instruction.

A zero in any of the B1, B2, X2, or B4 fields indicates the absence of the corresponding address component. For the absent component, a zero is used informing the intermediate sum, regardless of the contents of general register 0. A displacement of zero has no special significance.

Bits 31 and 32 of the current PSW are the addressing-mode bits. Bit 31 is the extended-addressing mode bit, and bit 32 is the basic-addressing-mode bit. These bits control the size of the effective address produced by address generation. When bits 31 and 32 of the current PSW both are zeros, the CPU is in the 24-bit addressing mode, and 24-bit instruction and operand effective addresses are generated. When bit 31 of the current PSW is zero and bit 32 is one, the CPU is in the 31-bit addressing mode, and 31-bit instruction and operand effective addresses are generated. When bits 31 and 32 of the current PSW are both one, the CPU is in the 64-bit addressing mode. and 64-bit instruction and operand effective addresses are generated. Execution of instructions by the CPU involves generation of the addresses of instructions and operands.

When an instruction is fetched from the location designated by the current PSW, the instruction address is increased by the number of bytes in the instruction, and the instruction is executed. The same steps are then repeated b using the new value of the instruction address to fetch the next instruction in the sequence. In the 24-bit addressing mode, instruction addresses wrap around, with the halfword at instruction address $2^{24}-2$ being followed by the half word at instruction address 0. Thus, in the 24-bit addressing mode, any carry out of PSW bit position 104, as a result of updating the instruction address, is lost. In the 31-bit or 64-bit addressing mode, instruction addresses similarly wrap around, with the halfword at instruction address $2^{31}-2^{64}-2$, respectively, followed by the halfword at instruction address 0. A carry out of PSW bit position 97 or 64, respectively, is lost.

An operand address that refers to storage is derived from an intermediate value, which either is contained in a register designated by an R field in the instruction or is calculated from the sum of three binary numbers: base address, index, and displacement. The base address (B) is a 64-bit number contained in a general register specified by the program in a four bit field, called the B field, in the instruction. Base addresses can he used as a means of independently addressing each program and data area. In array type calculations, it can designate the location of an array, and, in record-type processing, it can identify the record. The base address provides for addressing the entire storage. The base address may also he used for indexing.

The index (X) is a 64-bit number contained in a general register designated by the program in a four-bit field, called the X field, in the instruction. It is included only in the address specified by the RX-, RXE-, and RXY-format instructions. The RX-, RXE-, RXF-, and RXY-format instructions permit double indexing; that is, the index can be used to provide the address of an element within an array.

The displacement (D) is a 12-bit or 20-bit number contained in a field, called the D field, in the instruction. A 12-bit displacement is unsigned and provides for relative addressing of up to 4,095 bytes beyond the location designated by the base address. A 20-bit displacement is signed and provides for relative addressing of up to 524,287 bytes beyond the base address location or of up to 524,288 bytes before it. In array-type calculations, the displacement can be used to specify one of many items associated with an element. In the processing of records, the displacement can he used to identify items within a record. A 12-bit displacement is in bit positions 20-31 of instructions of certain formats. In instructions of some formats, a second 12-bit displacement also is in the instruction, in bit positions 36-47.

A 20-bit displacement is in instructions of only the RSY, RXY, or SIY format. In these instructions, the D field consists of a DL (low) field in bit positions 20-31 and of a DH (high) field in bit positions 32-39. When the long-displacement facility is installed, the numeric value of the displacement is formed by appending the contents of the DH field on the left of the contents of the DL field. When the long-displacement facility is not installed, the numeric value of the displacement is formed by appending eight zero bits on the left of the contents of the DL field, and the contents of the DH field are ignored.

In forming the intermediate sum, the base address and index are treated as 64-bit binary integers. A 12-bit displacement is treated as a 12-bit unsigned binary integer, and 52 zero bits are appended on the left. A 20-bit displacement is treated as a 20-bit signed binary integer, and 44 bits equal to the sign bit are appended on the left. The three are added as 64-bit binary numbers, ignoring overflow. The sum is always 64 bits long and is used as an intermediate value to form the generated address. The bits of the intermediate value are numbered 0-63. A zero in any of the B1, B2, X2, or B4 fields indicates the absence of the corresponding address component. For the absent component, a zero is used in forming the intermediate sum, regardless of the contents of general register 0. A displacement of zero has no special significance.

When an instruction description specifies that the contents of a general register designated by an R field are used to address an operand in storage, the register contents are used as the 64-bit intermediate value.

An instruction can designate the same general register both for address computation and as the location of an operand. Address computation is completed before registers, if any, are changed by the operation. Unless otherwise indicated in an individual instruction definition, the generated operand address designates the leftmost byte of an operand in storage.

The generated operand address is always 64 bits long, and the bits are numbered 0- 63. The manner in which the generated address is obtained from the intermediate value depends on the current addressing mode. In the 24-bit addressing mode, bits 0-39 of the intermediate value are ignored, bits 0-39 of the generated address are forced to be zeros, and bits 40-63 of the intermediate value become bits 40-63 of the generated address. In the 31-bit addressing mode, bits 0-32 of the intermediate value are ignored, bits 0-32 of the generated address are forced to be zero, and bits 33-63 of the intermediate value become bits 33-63 of the generated address. In the 64-bit addressing mode, bits 0-63 of the intermediate value become bits 0-63 of the generated address. Negative values may be used in index and base-address registers. Bits 0-32 of these values are ignored in the 31-bit addressing mode, and bits 0-39 are ignored in the 24-bit addressing mode.

For branch instructions, the address of the next instruction to be executed when the branch is taken is called the branch address. Depending on the branch instruction, the instruction format may be RR, RRE, RX, RXY, RS, RSY, RSI, RI, RIE, or RIL. In the RS, RSY, RX, and RXY formats, the branch address is specified by a base address, a displacement, and, in the RX and RXY formats, an index. In these formats, the generation of the intermediate value follows the same rules as for the generation of the operand-address intermediate value. In the RR and RRE formats, the contents of the general register designated by the R2 field are used as the intermediate value from which the branch address is formed. General register d cannot be designated as containing a branch address. A value of zero in the R2 field causes the instruction to he executed without branching.

The relative-branch instructions are in the RSI, RI, RIE, and RIL formats. In the RSI, RI, and RIE formats for the relative branch instructions, the contents of the I2 field ate treated as a 16-bit signed binary integer designating a number of halfwords. In the RIL format, the contents of the I2 field are treated as a 32-bit signed binary integer designating a number of halfwords. The branch address is the number of halfwords designated by the I2 field added to the address of the relative-branch instruction.

The 64-bit intermediate value for a relative branch instruction in the RSI, RI, RIE, or RIL format is the sum of two addends, with overflow from bit position 0 ignored. In the RSI, RI, or RIE format, the first addend is the contents of the I2 field with one zero bit appended on the right and 47 bits equal to the sign bit of the contents appended on the left, except that for COMPARE AND BRANCH RELATIVE, COMPARE IMMEDIATE AND BRANCH RELATIVE, COMPARE LOGICAL AND BRANCH RELATIVE and COMPARE LOGICAL IMMEDIATE AND BRANCH RELATIVE, the first addend is the contents of the I4 field, with bits appended as described above for the I2 field. In the RIL format, the first addend is the contents of the I2 field with one zero bit appended on the right and 31 bits equal to the sign bit of the contents appended on the left. In all formats, the second addend is the 64-bit address of the branch instruction. The address of the branch instruction is the instruction address in the PSW before that address is updated to address the next sequential instruction, or it is the address of the target of the EXECUTE instruction if EXECUTE is used. If EXECUTE is used in the 24-bit or 31-bit addressing mode, the address of the branch instruction is the target address with 40 or 33 zeros, respectively, appended on the left.

The branch address is always 64 bits long, with the bits numbered 0-63. The branch address replaces bits 64-127 of the current PSW. The manner in which the branch address is obtained from the intermediate value depends on the addressing mode, For those branch instructions which change the addressing mode, the new addressing mode is used. in the 24-bit addressing mode, bits 0-39 of the intermediate value are ignored, bits 0-39 of the branch address are made zeros, and bits 40-63 of the intermediate value become bits 40-63 of the branch address. In the 31-bit addressing mode, bits 0-32 of the intermediate value are ignored, bits 0-32 of the branch address are made zeros, and bits 33-63 of the intermediate value become bits 33-63 of the branch address. In the 64-bit addressing mode, bits 0-63 of the intermediate value become bits 0-63 of the branch address.

For several branch instructions, branching depends on satisfying a specified condition. When the condition is not satisfied, the branch is not taken, normal sequential instruction execution continues, and the branch address is not used. When a branch is taken, bits 0-63 of the branch address replace bits 64-127 of the current PSW. The branch address is not used to access storage as part of the branch operation. A specification exception due to an odd branch address and access exceptions due to fetching of the instruction at the branch location are not recognized as part of the branch operation but instead are recognized as exceptions associated with the execution of the instruction at the branch location.

A branch instruction, such as BRANCH AND SAVE, can designate the same general register for branch address computation and as the location of an operand. Branch-address computation is completed before the remainder of the operation is performed.

The program-status word (PSW), described in Chapter 4 "Control" contains information required for proper program execution. The PSW is used to control instruction sequencing and to hold and indicate the status of the CPU in relation to the program currently being executed. The active or controlling PSW is called the current PSW. Branch instructions perform the fir-rations of decision making, loop control, and subroutine linkage. A branch instruction affects instruction sequencing by introducing a new instruction address into the current PSW. The relative-branch instructions with a 16-bit I2 field allow branching to a location at an offset of up to plus 64K-2 bytes or minus 64K bytes relative to the location of the branch instruction, without the use of a base register. The relative-branch instructions with a 32-bit I2 field allow branching to a location at an offset of up to plus 4G-2 bytes or minus 40 bytes relative to the location of the branch instruction. without the use of a base register.

Facilities for decision making are provided by the BRANCH ON CONDITION, BRANCH RELATIVE ON CONDITION, and BRANCH RELATIVE ON CONDITION LONG instructions. These instructions inspect a condition code that reflects the result of a majority of the arithmetic, logical, and I/O operations. The condition code, which consists of two bits, provides for four possible condition-code settings: 0, 1, 2, and 3.

The specific meaning of any setting depends on the operation that sets the condition code. For example, the condition code reflects such conditions as zero, nonzero, first operand high, equal, overflow, and subchannel busy. Once set, the condition code remains unchanged until modified by an instruction that causes a different condition code to be set.

Loop control can he performed by the use of BRANCH ON CONDITION, BRANCH RELATIVE ON CONDITION, and BRANCH RELATIVE ON CONDITION LONG to test the outcome of address arithmetic and counting operations. For some particularly frequent combinations of arithmetic and tests, BRANCH ON COUNT, BRANCH ON INDEX HIGH, and BRANCH ON INDEX LOW OR EQUAL are provided, and relative-branch equivalents of these instructions are also provided. These branches, being specialized, provide increased performance for these tasks.

Subroutine linkage when a change of the addressing mode is not required is provided by the BRANCH AND LINK and BRANCH AND SAVE instructions. (This discussion of BRANCH AND SAVE applies also to BRANCH RELATIVE AND SAVE and BRANCH RELATIVE AND SAVE LONG.) Both of these instructions permit not only the introduction of a new instruction address but also the preservation of a return address and associated information. The return address is the address of the instruction following the branch instruction in storage, except that it is the address of the instruction following an EXECUTE instruction that has the branch instruction as its target.

Both BRANCH AND LINK and BRANCH AND SAVE have an R1 field. They form a branch address by means of fields that depend on the instruction. The operations of the instructions are summarized as follows:

In the 24-bit addressing mode, both instructions place the return address in bit positions 40-63 of general register R1 and leave bits 0-31 of that register unchanged. BRANCH AND LINK places the instruction-length code for the instruction and also the condition code and program mask from the current PSW in bit positions 32-39 of general register R1 BRANCH AND SAVE places zeros in those bit positions.

In the 31-bit addressing mode, both instructions place the return address in bit positions 33-63 and a one in bit position 32 of general register R1, and they leave bits 0-31 of the register unchanged.

In the 64-bit addressing mode, both instructions place the return address in bit positions 0-63 of general register R1. p1 In any addressing mode, both instructions generate the branch address under the control of the current addressing mode. The instructions place bits 0-63 of the branch address in bit positions 64-127 of the PSW. In the RR format, both instructions do not perform branching if the R2 field of the instruction is zero.

It can be seen that, in the 24-bit or 31-bit addressing mode, BRANCH AND SAVE places the basic addressing-mode bit, bit 32 of the P5W, in bit position 32 of general register R1. BRANCH AND LINK does so in the 31-bit addressing mode. The instructions BRANCH AND SAVE AND SET MODE and BRANCH AND SET MODE are for use when a change of the addressing mode is required during linkage. These instructions have R1 and R2 fields. The operations of the instructions are summarized as follows:

BRANCH AND SAVE AND SET MODE sets the contents of general register R1 the same as BRANCH AND SAVE. in addition, the instruction places the extended-addressing-mode bit, bit 31 of the PSW, in bit position 63 of the register.

BRANCH AND SET MODE, if R1 is nonzero, performs as follows. In the 24- or 31-bit mode, it places bit 32 of the PSW in bit position 32 of general register R1, and it leaves bits 0-31 and 33-63 of the register unchanged. Note that bit 63 of the register should be zero if the register contains an instruction address. in the 64-bit mode, the instruction places bit 31 of the PSW (a one) in bit position 63 of general register R1, and it leaves bits 0-62 of the register unchanged.

When R2 is nonzero, both instructions set the addressing mode and perform branching as follows. Bit 63 of general register R2 is placed in bit position 31 of the PSW. If bit 63 is zero, bit 32 of the register is placed in bit position 32 of the PSW. If bit 63 is one, PSW bit 32 is set to one. Then the branch address is generated from the contents of the register, except with bit 63 of the register treated as a zero, under the control of the new addressing mode. The instructions place bits 0-63 of the branch address in bit positions 64-127 of the PSW. Bit 63 of general register R2 remains unchanged and, therefore, may he one upon entry to the called program. If R2 is the same as R1, the results in the designated general register are as specified for the R1 register.

Interruptions (Context Switch):

The interruption mechanism permits the CPU to change its state as a result of conditions external to the configuration, within the configuration, or within the CPU itself. To permit fast response to conditions of high priority and immediate recognition of the type of condition, interruption conditions are grouped into six classes: external, input/output, machine check, program, restart, and supervisor call.

An interruption consists in storing the current PSW as an old PSW, storing information identifying the cause of the interruption, and fetching a new PSW, Processing resumes as specified by the new PSW. The old PSW stored on an interruption normally contains the address of the instruction that would have been executed next had the interruption not occurred, thus permitting resumption of the interrupted program. For program and supervisor-call interruptions, the information stored also contains a code that identifies the length of the last-executed instruction, thus permitting the program to respond to the cause of the interruption. In the case of some program conditions for which the normal response is re-execution of the instruction causing the interruption, the instruction address directly identifies the instruction last executed.

Except for restart, an interruption can occur only when the CPU is in the operating state. The restart interruption can occur with the CPU in either the stopped or operating state.

Any access exception is recognized as part of the execution of the instruction with which the exception is associated. An access exception is not recognized. when the CPU attempts to prefetch from an unavailable location or detects some other access-exception condition, but a branch instruction or an interruption changes the instruction sequence such that the instruction is not executed. Every instruction can cause an access exception to be recognized because of instruction fetch. Additionally, access exceptions associated with instruction execution may occur because of an access to an operand in storage. An access exception due to fetching an instruction is indicated when the first instruction halfword cannot be fetched without encountering the exception. When the first halfword of the instruction has no access exceptions, access exceptions may be indicated for additional halfwords according to the instruction length specified by the first two bits of the instruction; however, when the operation can be performed without accessing the second or third halfwords of the instruction, it is unpredictable whether the access exception is indicated for the unused part. Since the indication of access exceptions for instruction fetch is common to all instructions, it is not covered in the individual instruction definitions.

Except where otherwise indicated in the individual instruction description, the following rules apply for exceptions associated with an access to an operand location. For a fetch-type operand, access exceptions are necessarily indicated only for that portion of the operand which is required for completing the operation. It is unpredictable whether access exceptions are indicated for those portions of a fetch-type operand which are not required for completing the operation.

For a store-type operand, access exceptions are recognized for the entire operand even if the operation could he completed without the use of the inaccessible part of the operand. In situations where the value of a store-type operand is defined to be unpredictable, it is unpredictable whether an access exception is indicated. Whenever an access to an operand location can cause an access exception to be recognized, the word "access" is included. in the list of program exceptions in the description of the instruction. This entry also indicates which operand can cause the exception to he recognized and whether the exception is recognized on a fetch or store access to that operand location. Access exceptions are recognized only for the portion of the operand as defined for each particular instruction.

An operation exception is recognized when the CPU attempts to execute an instruction with an invalid operation code. The operation code may he unassigned, or the instruction with that operation code may not be installed on the CPU, The operation is suppressed. The instruction-length code is 1, 2, or 3. The operation exception is indicated by a program interruption code of 0001 hex (or 0081 hex if a concurrent PER event is indicated).

Some models may offer instructions not described in this publication, such as those provided for assists or as part of special or custom features. Consequently, operation codes not described in this publication do not necessarily cause an operation exception to be recognized. Furthermore, these instructions may cause modes of operation to be set up or may otherwise alter the machine so as to affect the execution of subsequent instructions. To avoid causing such an operation, an instruction with an operation code not described in this publication should be executed only when the specific function associated with the operation code is desired.

A specification exception is recognized when any of the following is true:
1. A one is introduced into an unassigned bit position of the PSW (that is, any of bit positions 0, 2-4, 24-30, or 33-63). This is handled as an early PSW specification exception.
2. A one is introduced into bit position 12 of the PSW. This is handled as an early PSW specification exception.
3. The PSW is invalid in any of the following ways: a. Bit 31 of the PSW is one and bit 32 is zero. b. Bits 31 and 32 of the PSW are zero, indicating the 24-bit addressing mode, and bits 64-103 of the PSW are not all zeros. c. Bit 31 of the PSW is zero and bit 32 is one, indicating the 31-bit addressing mode, and bits 64-96 of the PSW are not all zeros. This is handled as an early PSW specification exception.
4. The PSW contains an odd instruction address.
5. An operand address does not designate an integral boundary in an instruction requiring such integral-boundary designation.
6. An odd-numbered general register is designated by an R field of an instruction that requires an even-numbered register designation.
7. A floating-point register other than 0, 1, 4, 5, 8, 9, 12, or 13 is designated for an extended operand.
8. The multiplier or divisor in decimal arithmetic exceeds 15 digits and sign.
9. The length of the first-operand field is less than or equal to the length of the second-operand field in decimal multiplication or division.
10. Execution of CIPHER MESSAGE, CIPHER MESSAGE WITH CHAINING, COMPUTE INTERMEDIATE MESSAGE DIGEST, COMPUTE LAST MESSAGE DIGEST, or COMPUTE MESSAGE AUTHENTICATION CODE is attempted, and the function code in bits 57-63 of general register 0 contain an unassigned or uninstalled function code.
11. Execution of CIPHER MESSAGE or CIPHER MESSAGE WITH CHAINING is attempted, and the R1 or R2 field designates an odd-numbered register or general register 0.
12. Execution of CIPHER MESSAGE, CIPHER MESSAGE WITH CHAINING, COMPUTE INTERMEDIATE MESSAGE DIGEST or COMPUTE MESSAGE AUTHENTICATION CODE is attempted, and the second operand length is not a multiple of the data block size of the designated function. This specification-exception condition does not apply to the query functions.
13. Execution of COMPARE AND FORM CODEWORD is attempted, and general registers 1, 2, and 3 do not initially contain even values.
32. Execution of COMPARE AND SWAP AND STORE is attempted and any of the following conditions exist:
    The function code specifies an unassigned value.
    The store characteristic specifies an unassigned value.
    The function code is 0, and the first operand is not designated on a word boundary.
    The function code is 1, and the first operand is not designated on a doubleword boundary.
    The second operand is not designated on an integral boundary corresponding to the size of the store value.
33. Execution of COMPARE LOGICAL LONG UNICODE or MOVE LONG UNICODE is attempted, and the contents of either general register R1+1 or R3+1 do not specify an even number of bytes.
34. Execution of COMPARE LOGICAL STRING, MOVE STRING or SEARCH STRING is attempted, and bits 32-55 of general register 0 are not all zeros.
35. Execution of COMPRESSION CALL is attempted, and bits 48-51 of general register 0 have any of the values 0000 and 0110-1111 binary.
36. Execution of COMPUTE INTERMEDIATE MESSAGE DIGEST, COMPUTE LAST MESSAGE DIGEST, or COMPUTE MESSAGE AUTHENTICATION CODE is attempted, and either of the following is true:
    The R2 field designates an odd-numbered register or general register 0.
    Bit 56 of general register 0 is not zero.
37. Execution of CONVERT IMP TO BFP, CONVERT TO FIXED (BFP or HFP), or LOAD FP INTEGER (BFP) is attempted, and the M3 field does not designate a valid modifier.
38. Execution of DIVIDE TO INTEGER is attempted, and the M4 field does not designate a valid modifier.
39. Execution of EXECUTE is attempted, and the target address is odd.
40. Execution of EXTRACT STACKED STATE is attempted, and the code in bit positions 56-63 of general register R2 is greater than 4 when the ASN-and-LX-reuse facility is not installed or is greater than 5 when the facility is installed.
41. Execution of FIND LEFTMOST ONE is attempted, and the R1 field designates an oddnumbered register.
42. Execution of INVALIDATE DAT TABLE ENTRY is attempted, and bits 44-51 of general register R2 are not all zeros.
43. Execution of LOAD FPC is attempted, and one or more bits of the second operand corresponding to unsupported bits in the FPC register are one.
44. Execution of LOAD PAGE-TABLE-ENTRY ADDRESS is attempted and the M4 field of the instruction contains any value other than 0000-0100 binary.
45. Execution of LOAD PSW is attempted and bit 12 of the doubleword at the second-operand. address is zero. It is model dependent whether or not this exception is recognized.
46. Execution of MONITOR CALL is attempted, and bit positions 8-11 of the instruction do not contain zeros.
47. Execution of MOVE PAGE is attempted, and bit positions 48-51 of general register 0 do not contain zeros or bits 52 and 53 of the register are both one.
48. Execution of PACK ASCII is attempted, and the L2 field is greater than 31.
49. Execution of PACK UNICODE is attempted, and the L2 field is greater than 63 or is even.
50. Execution of PERFORM FLOATING POINT OPERATION is attempted, bit 32 of general register 0 is zero, and one or more fields in bits 33-63 are invalid or designate an uninstalled function.
51. Execution of PERFORM LOCKED OPERATION is attempted, and any of the following is true:

The T bit, bit 55 of general register 0 is zero, and the function code in bits 56-63 of the register is invalid.

Bits 32-54 of general register 0 are not all zeros.

In the access-register mode, for function codes that cause use of a parameter list containing an ALET, the R3 field is zero.

52. Execution of PERFORM TIMING FACILITY FUNCTION is attempted, and either of the following is true:

Bit 56 of general register 0 is not zero.

Bits 57-63 of general register 0 specify an unassigned or uninstalled function code.

53. Execution of PROGRAM TRANSFER or PROGRAM TRANSFER WITH INSTANCE is attempted, and all of the following are true:

The extended-addressing-mode bit in the PSW is zero.

The basic-addressing-mode bit, bit 32, in the general register designated by the R2 field of the instruction is zero.

Bits 33-39 of the instruction address in the same register are not all zeros.

54. Execution of RESUME PROGRAM is attempted, and either of the following is true:

Bits 31, 32, and 64-127 of the PSW field in the second operand are not valid for placement in the current PSW. The exception is recognized if any of the following is true:

Bits 31 and 32 are both zero and bits 64-103 are not all zeros.

Bits 31 and 32 are zero and one, respectively, and bits 64-96 are not all zeros.

Bits 31 and 32 are one and zero, respectively.

Bit 127 is one.

Bits 0-12 of the parameter list are not all zeros.

55. Execution of SEARCH STRING UNICODE is attempted, and bits 32-47 of general register 0 are not all zeros.

56. Execution of SET ADDRESS SPACE CONTROL or SET ADDRESS SPACE CONTROL FAST is attempted, and bits 52 and 53 of the second-operand address are not both zeros.

57. Execution of SET ADDRESSING MODE (SAM24) is attempted, and bits 0-39 of the un-updated instruction address in the PSW, bits 64-103 of the PSW, are not all zeros.

58. Execution of SET ADDRESSING MODE (SAM31) is attempted, and bits 0-32 of the un-updated instruction address in the PSW, bits 64-96 of the PSW, are not all zeros.

59. Execution of SET CLOCK PROGRAMMABLE FIELD is attempted, and bits 32-47 of general register 0 are not all zeros.

60. Execution of SET FPC is attempted, and one or more bits of the first operand corresponding to unsupported bits in the FTC register are one.

61. Execution of STORE SYSTEM INFORMATION is attempted, the function code in general register 0 is valid, and either of the following is true:

Bits 36-55 of general register 0 and bits 32-47 of general register 1 are not all zeros.

The second-operand address is not aligned on a 4K-byte boundary.

62. Execution of TRANSLATE TWO TO ONE or TRANSLATE TWO TO TWO is attempted, and the length in general register $R_{i+1}$ does not specify an even number of bytes.

63. Execution of UNPACK ASCII is attempted, and the L1 field is greater than 31.

64. Execution of UNPACK UNICODE is attempted, and the L1 field is greater than 63 or is even.

65. Execution of UPDATE TREE is attempted, and the initial contents of general registers 4 and 5 are not a multiple of 8 in the 24-bit or 31-bit addressing mode or are not a multiple of 16 in the 64-bit addressing mode. The execution of the instruction identified by the old PSW is suppressed. However, for early PSW specification exceptions (causes 1-3) the operation that introduces the new PSW is completed, but an interruption occurs immediately thereafter. Preferably, the instruction-length code (ILC) is 1, 2, or 3, indicating the length of the instruction causing the exception. When the instruction address is odd (cause 4 on page 6-33), it is unpredictable whether the ILC is 1, 2, or 3. When the exception is recognized because of an early PSW specification exception (causes 1-3) and the exception has been introduced by LOAD PSW, LOAD PSW EXTENDED, PROGRAM RETURN, or an interruption, the ILC is 0. When the exception is introduced by SET ADDRESSING MODE (SAM24, SAM31), the ILC is 1, or it is 2 if SET ADDRESSING MODE was the target of EXECUTE. When the exception is introduced by SET SYSTEM MASK or by STORE THEN OR SYSTEM MASK, the ILC is 2.

Program interruptions are used to report exceptions and events which occur during execution of the program. A program interruption causes the old PSW to be stored at real locations 336-351 and a new PSW to be fetched from real locations 464-479. The cause of the interruption is identified by the interruption code. The interruption code is placed at real locations 142-143, the instruction-length code is placed in bit positions 5 and 6 of the byte at real location 141 with the rest of the bits set to zeros, and zeros are stored at real location 140. For some causes, additional information identifying the reason for the interruption is stored at real locations 144-183. If the PER-3 facility is installed, then, as part of the program interruption action, the contents of the breaking-event-address register are placed in real storage locations 272-279. Except for PER events and the crypto-operation exception, the condition causing the interruption is indicated by a coded value placed in the rightmost seven bit positions of the interruption code. Only one condition at a time can be indicated. Bits 0-7 of the interruption code are set to zeros. PER events are indicated by setting bit 8 of the interruption code to one. When this is the only condition, bits 0-7 and 9-15 are also set to zeros. When a PER event is indicated concurrently with another program interruption condition, bit 8 is one, and bits 0-7 and 9-15 are set as for the other condition. The crypto-operation exception is indicated by an interruption code of 0119 hex, or 0199 hex if a PER event is also indicated.

When there is a corresponding mask bit, a program interruption can occur only when that mask bit is one. The program mask in the PSW controls four of the exceptions, the IEEE masks in the FPC register control the IEEE exceptions, bit 33 in control register 0 controls whether SET SYSTEM MASK causes a special-operation exception, bits 48-63 in control register 8 control interruptions due to monitor events, and a hierarchy of masks control interruptions due to PER events. When any controlling mask bit is zero, the condition is ignored; the condition does not remain pending.

When the new PSW for a program interruption has a PSW-format error or causes an exception to he recognized in the process of instruction fetching, a string of program interruptions may occur.

Some of the conditions indicated as program exceptions may be recognized also by the channel subsystem, in which case the exception is indicated in the subchannel-status word or extended-status word.

When a data exception causes a program interruption, a data-exception code (DXC) is stored at location 147, and zeros are stored at locations 144-146. The DXC distinguishes between the various types of data-exception conditions. When the APP-register (additional floating-point register) control bit, bit 45 of control register 0, is one, the DXC is also placed in the DXC field of the floating-point-control (FPC) register. The DXC field in the FPC register remains unchanged when any other program exception is reported. The DXC is an 8-bit code indicating the specific cause of a data exception.

DXC 2 and 3 are mutually exclusive and are of higher priority than any other DXC. Thus, for example, DXC 2 (BFP instruction) takes precedence over any IEEE exception, and DXC 3 (DFP instruction) takes precedence over any IEEE exception or simulated IEEE exception. As another example, if the conditions for both DXC 3 (DFP instruction) and DXC 1 (AFP register) exist, DXC 3 is reported. When both a specification exception and an AFP register data exception apply, it is unpredictable which one is reported.

An addressing exception is recognized when the CPU attempts to reference a main-storage location that is not available in the configuration. A main-storage location is not available in the configuration when the location is not installed, when the storage unit is not in the configuration, or when power is off in the storage unit. An address designating a storage location that is not available in the configuration is referred to as invalid. The operation is suppressed when the address of the instruction is invalid. Similarly, the operation is suppressed when the address of the target instruction of EXECUTE is invalid. Also, the unit of operation is suppressed when an addressing exception is encountered in accessing a table or table entry. The tables and table entries to which the rule applies are the dispatchable-unit-control table, the primary ASN second- table entry, and entries in the access list, region first table, region second table, region third table, segment table, page table, linkage table, linkage-first table, linkage-second table, entry table, ASN first table, ASN second table, authority table, linkage stack, and trace table, Addressing exceptions result in suppression when they are encountered for references to the region first table, region second table, region third table, segment table, and page table, in both implicit references for dynamic address translation and references associated with the execution of LOAD PAGE-TABLE-ENTRY ADDRESS, LOAD REAL ADDRESS, STORE REAL ADDRESS, and TEST PROTECTION. Similarly, addressing exceptions for accesses to the dispatchable-unit control table, primary ASN-second-table entry, access list, ASN second table, or authority table result in suppression when they are encountered in access-register translation done either implicitly or as part of LOAD PAGE-TABLE-ENTRY ADDRESS, LOAD REAL ADDRESS, STORE REAL ADDRESS, TEST ACCESS, or TEST PROTECTION. Except for some specific instructions whose execution is suppressed, the operation is terminated for an operand address that can be translated but designates an unavailable location. For termination, changes may occur only to result fields. In this context, the term "result field" includes the condition code, registers, and any storage locations that are provided and that are designated to he changed by the instruction.

The forgoing is useful in understanding the terminology and structure of one computer system embodiment. Embodiments not limited to the z/Architecture or to the description provided thereof. Embodiments can be advantageously applied to other computer architectures of other computer manufacturers with the teaching herein.

Different processor architectures provide a limited number of general registers (GRs), sometimes referred to as general purpose registers, that are explicitly (and/or identified by instructions of the architected instruction set. IBM z/Architecture and its predecessor architectures (dating, back to the original System 360 circa.1964) provide 16 general registers (GRs) for each central processing unit (CPU). GRs may be used by processors (central processing unit (CPU)) instructions as follows:

As a source operand of an arithmetic or logical operation.
As a target operand of an arithmetic or logical operation.
As a the address of a memory operand (either a base register, index register, or directly)
As the length of a memory operand
Other uses such as providing a function code or other information to and from an instruction.

Until the introduction of the IBM z/Architecture mainframe in 2000, a mainframe general register consisted of 32 bits; with the introduction of z/Architecture, a general register consisted of 64 bits, however, for compatibility reasons, many z/Architecture instructions continue to support 32 bits.

Similarly, other architectures, such as the x86 from Intel® for example, provide compatibility modes such that a current machine, having, for example 32 bit registers, provide modes for instructions to access only the first 8 bits or 16 bits of the 32 bit GR.

Even in early IBM System 360 environments, 16 registers (identified by a 4 bit register field in an instruction for example) proved to be daunting to assembler programmers and compiler designers. A moderately-size program could require several base registers to address code and data, limiting the number of registers available to hold active variables. Certain techniques have been used to address the limited number of registers:

Program design (as simple as modular programming) helped to minimize base-register overutilization,
Compilers have used techniques such as register "coloring" to manage the dynamic reassignment of registers.
Base register usage can be reduced with the following:
Newer arithmetic and logical instructions with immediate constants (within the instruction),
Newer instructions with relative-immediate operand addresses.
Newer instructions with long displacements.

However, there remains constant register pressure when there are more live variables and addressing scope than can be accommodated by the number of registers in the CPU.

z/Architecture provides three program-selectable addressing modes: 24-, 31-, and 64-bit addressing. However, for programs that neither require 64-bit values nor exploit 64-bit memory addressing, having 64-bit GRs is of limited benefit. The following disclosure describes a technique of exploiting 64-bit registers for programs that do not generally use 64-bit addressing or variables.

Within this disclosure, a convention is used where bit positions of registers are numbered in ascending order from left to right (Big Endian). In a 64-bit register, bit 0 (the leftmost bit) represents the most significant value ($2^{63}$) and bit 63 (the rightmost bit) represents the least significant value ($2^0$). The leftmost 32 bits of such a register (bits 0-31)

are called the high word, and the rightmost 32 bits of the register (bits 32-63) are called the low word where a word is 32 bits.

High-Word Facility:

A new suite of general instructions (that is, instructions available to an application program) is introduced to exploit the high word. (the most-significant 32 bits) of a 64-bit general register when the CPU is in 32 bit mode. The program can employ the new instructions to access the hidden (previously unavailable) high words of the GPR in addition to the old instructions which continue to be restricted. to the low words.

Figure 18:
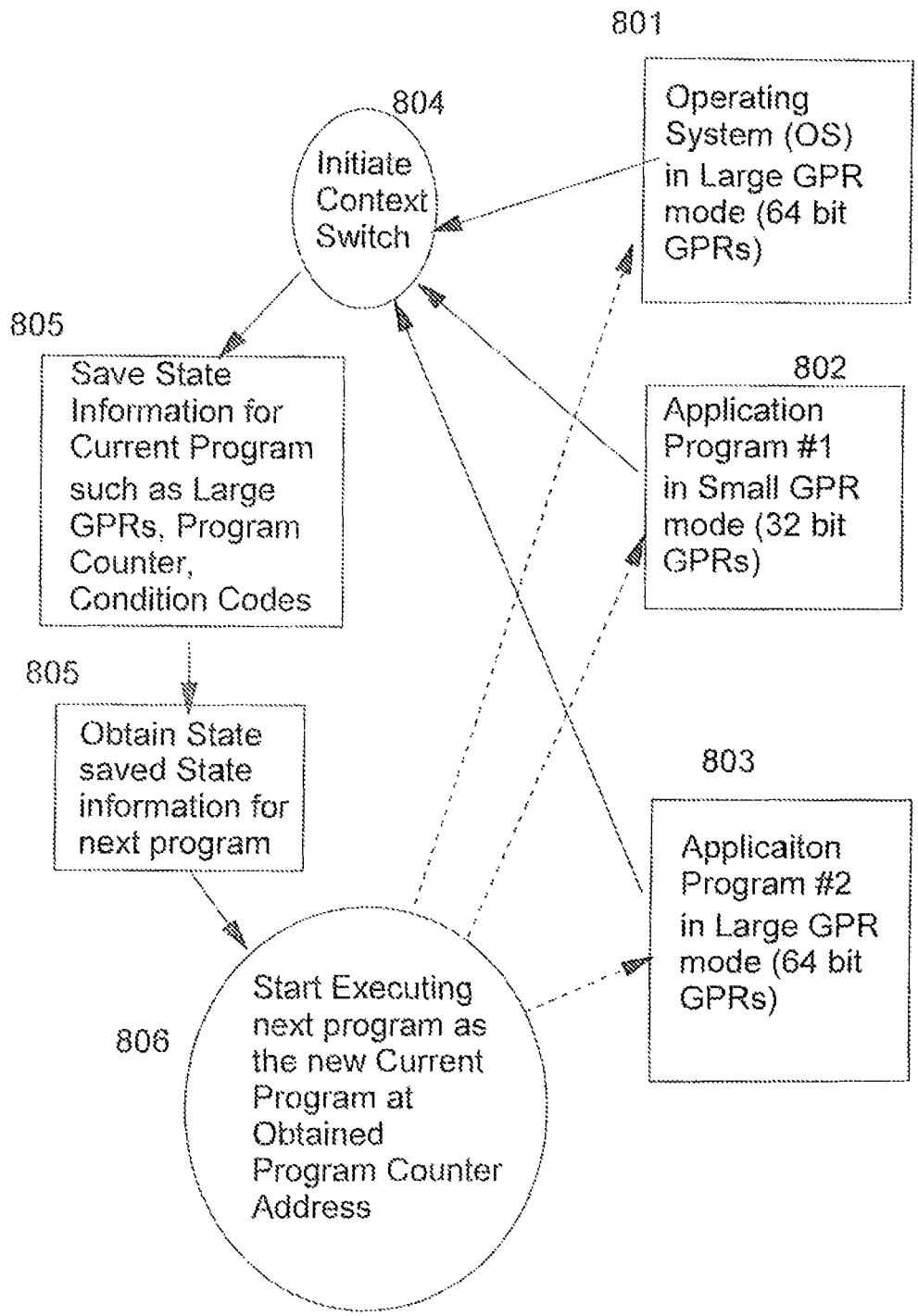
FIG. 18 depicts an example context switch now.

Referring to FIG. 18, a program written to an architecture having 16 or 32 bit registers may be run on a newer version of the architecture supporting 64 bit registers. The program written for, say, a 32 bit mode is only aware of 32 bit registers, and typically 32 or fewer logical address bits. An Operating System (OS) 801 in a 64 bit architected computer system may support programs written for 64 bit mode 803 as well as programs written for 32 bit mode 802. A context switch operation 804 in such a machine will save 805 the 64 bit registers as well as the Program Status Word (PSW) when switching between programs and/or the operating system independent of whether the Application program 802 803 was in 32 or 64 bit mode. Thus, a 32 bit program running in 32 bit mode on a 64 bit machine under control of a 64 bit operating system, will have its registers saved and restored during certain context switches. The computer system and operating system may actually save and restore 805 all 64 bits of the general registers during the context switch, even though the program subject to the context switch is running in a 32 bit mode. Thus, the program sees only half of the registers, only 32 bits of the 64 bits of each register. The other 32 bits of the implemented registers is "hidden" from the 32 bit program. The 32 bits of the known registers, may be used for addressing, and even though the computer system supports 64 bits of addressing, the OS can manage via Dynamic Address Translation, such that only 32 bits of address are manipulated by the 32 bit program in 32 bit mode. The 32 bit mode may be thought of as a low-word mode since the program is only utilizing the low word (32 bit word) of a double word (64 bit) register. An Application Program operates under control of the OS, and invokes the OS in order to have the OS perform certain functions, This "invoking" is performed by the context switch 804 that saves state of the application program and loads state 805 of the OS to be performed, where the OS begins execution at the address provided by the context switch. The OS can then invoke one of the application programs by a context switch 804 to permit the application program to run. In some applications, use of resources is supported by permitting each application, a time-slice of operation and a context switch 804 is used to "interrupt" the active program after an elapsed time in order to permit the OS to dispatch another application program for another time-slice.

The availability of the High-Word facility may be controlled by a bit or a field in the machine that must be set to enable the High-Word facility. When the High Word facility is enabled, the 32 bit program can take advantage of the "hidden" part of the register by executing new "high-word facility" instructions. Other new "high-word facility" instructions may be provided that provide new function to instructions using low-word registers.

In most of these instructions, only the high word of the registers is manipulated. In certain instructions, variants are provided to manipulate the high word of one source register with the low word of another source register, the result being placed in the high word of a target register (e.g., AHHLR). RISBLG provides a low-word analog to the high-word RISBHIG instruction. RISBHG and RISBLG provide great flexibility in implementing a number of pseudo-instructions (with assistance from the assembler program).

As mentioned above, processor architectures employ General Purpose Registers (GPRs), available to the Instruction Set of the architecture. A program can take advantage of data being in the GPRs, which may be implemented in high speed memory such as embedded latches on a chip, for faster performance than having the data in slower main store, which is often implemented by complex dynamic address translation mechanisms. In some architectures such as x86 having 64 GPRs, the size of each GPR has been increased evolutionary from 8 bits to 16 bits, 32 bits and currently 64 bits. However the number of GPRs available to an instruction ((64 for x86) determined by a number of bits (6 for x86) of a GPR field within an instruction) remains the same so that programs written for an older instruction having 8 bit GPRs for example, will still run on newer architectures having 32 bit GPRs for example. Thus, a machine having 32 bit GPRs operating in 8 bit mode, will provide access to only the lower 8 bits of each 32 bit GPR. However, during a context switch, the 32 bit Operating System (OS) will always save and restore the full 32 bits of each GPR.

In an IBM z/Architecture implementation, a machine may have 16 GPRs, each GPR consisting of 64 bits (bits 0-63) but may run an application program written for 32 bit registers in 32 bit mode. The 32 bits may be the low order 32 bits of the GPR (bits 32-63), where the high order 32 bits (bits 0-31) are not available (hidden) in a 32 bit mode of operation. The application program has no way of utilizing the high order 32 bits of the GPRs as they are invisible to the program. The application program, in an example, may have been written for a 32 bit machine of a prior generation of the machine having only 32 bit registers and addressing 24 or 32 bits of logical addresses to memory. The 32 bit mode enables the example 32 bit application program to run on a newer machine having an architecture supporting 64 bits of GPRs, having a 64 bit Operating System (OS) and supporting 64 bit application programs in 64 bit mode. In another machine architecture defined for 32 bit GPRs, a set of 32 bit "hidden GPRs" may be provided that are invisible to application programs.

A "High-Word Facility mode" is provided that enables a subset of instructions to access the hidden or High Order GPR.s, while the remaining set of instructions have access to the architected or Low Order GPRs.

Preferably, in "High-Word Facility mode", the subset of instructions may only access the High Order GPRs in one implementation, but in another implementation, the subset of instructions may define GPR field as being directed to the High Order GPRs and another GPR field as being directed to the low order GFRs.

In another preferred implementation, in "High-Word Facility mode", only low order GPRs can be used for generating main memory addresses.

In an implementation, applications executing in "High-Word Facility mode" can co-exist with applications not executing in "High-Word Facility mode". The applications not in High-Word Facility mode may be 32 bit GPR applications or 64 bit GPR applications. In this example, GPRs of a machine are utilized having 64 bits with applications written for GPRs utilizing 32 bits, however, the present embodiments would provide advantage in GPRs of a machine with any number of bits (16, 24, 32, 48, 64, 128) running applications written for GPRs having fewer number of bits (8, 16, 24, 32, 48, 64). Furthermore, High-Word Facility mode hidden registers may utilize only a designated portion of the hidden GPRs, such that, in the 32 bit application program of the previous example, the hidden registers available in High-Word Facility mode for some instructions may be the low order 8 or 16 bits of the high order 32 bits of the 64 bit GPRs, while other hidden registers may he the high order 8 or 16 bits of the high order 32 bits of the 65 bit GPRs for example. The teaching of embodiments is presented using z/Architecture and/or x86 architecture, however, other implementations are readily apparent to one of average skill, in light of the teaching herein.

In an example z/Architecture embodiment, for selected 32-bit instructions, the high-word facility effectively provides sixteen additional 32-bit registers (high word registers) by utilizing previously unavailable high order bits 0-31 of the sixteen 64-bit general registers (bits 0-63). In an embodiment, the High-Word facility may enable the following instructions with mnemonics indicating the function (AHHHR for ADD HIGH for example)

ADD HIGH (AHHHR, AHHLR)
ADD IMMEDIATE HIGH (AIH)
ADD LOGICAL HIGH (ALHHHR, ALHHHER)
ADD LOGICAL WITH SIGNED IMMEDIATE HIGH (ALSIH, ALSIHN)
BRANCH RELATIVE ON COUNT HIGH (BRCTH)
COMPARE HIGH (CHHR, CHLR, CHF)
COMPARE IMMEDIATE HIGH (CIH)
COMPARE LOGICAL HIGH (CLHHR, CLHLR, CLHF)
COMPARE LOGICAL IMMEDIATE HIGH (CLIH)
LOAD BYTE HIGH (LBH)
LOAD HALFWORD HIGH (LHH)
LOAD HIGH (LFH)
LOAD LOGICAL CHARACTER HIGH (LLCH)
LOAD LOGICAL HALFWORD HIGH (LLHH)
ROTATE THEN INSERT SELECTED BITS HIGH (RISBHG)
ROTATE THEN INSERT SELECTED BITS LOW (RISBLG)
STORE CHARACTER HIGH (STCH)
STORE HALFWORD HIGH (STHH)
STORE HIGH (STFH)
SUBTRACT HIGH (SHHHR, SHHLR)
SUBTRACT LOGICAL HIGH (SLHHHR, SLHHLR)

The following additional general instructions may be available when the interlocked-access facility is installed:
LOAD AND ADD (LAA, LAAG)
LOAD AND ADD LOGICAL (LAAL, LAALG)
LOAD AND AND (LAN, LANG)
LOAD AND EXCLUSIVE OR (LAX, LAXG)
LOAD AND OR (LAO, LAOG)
LOAD PAIR DISJOINT (LPD, LPDG)

The following additional general instructions may be available when the load/store-on-condition facility is installed:
LOAD ON CONDITION (LOC, LGOC, LGROC, LROC)
STORE ON CONDITION (STOC, STGOC)

The following additional general instructions may be available when the distinct-operands facility is installed
ADD (ARK, AGRK)
ADD IMMEDIATE (AHIK, AGHIK)
ADD LOGICAL (ALRK, ALGRK)
ADD LOGICAL WITH SIGNED IMMEDIATE (ALHSIK, ALGHSIK)
AND (NRK, NGRK)
EXCLUSIVE OR (XRK, XGRK)
OR (ORK, OGRK)
SHIFT LEFT SINGLE (SLAK)
SHIFT LEFT SINGLE LOGICAL (SLLK)
SHIFT RIGHT SINGLE (SRAK)
SHIFT RIGHT SINGLE LOGICAL (SRLK)
SUBTRACT (SRK, SGRK)
SUBTRACT LOGICAL (SLRK, SLGRK)

Example High-Word Instructions:

The following are example instructions that may employ the High-Word facility.

Add High (RRF Format)

When the instruction is executed by the computer system, the second operand is added to the third operand, and the sum is placed at the first-operand location. The operands and the sum are treated as 32-bit signed binary integers. The first and second operands are in bits 0-31 of general registers R1 and R2, respectively; bits 32-63 of general register R1 are unchanged, and bits 32-63 of general register R2 are ignored. For AHHHR OpCode, the third operand is in bits 0-31 of general register R3; bits 32-63 of the register are ignored. For AHHLR OpCode, the third operand is in bits 32-63 of general register R3: bits 0-31 of the register are ignored. When there is an overflow, the result is obtained by allowing any carry into the sign-bit position and ignoring any carry out of the sign-bit position, and condition code 3 is set. If the fixed-point-overflow mask is one, a program interruption for fixed-point overflow occurs.

Resulting Condition Code:
0 Result zero; no overflow
1 Result less than zero; no overflow
2 Result greater than zero; no overflow
3 Overflow Program Exceptions:
Fixed-point overflows
Operation if the high-word facility is not installed)

Add Immediate High (RIL Format)

When the instruction is executed by the computer system, the second operand is added to the first operand, and the sum is placed at the first-operand location. The operands and the sum are treated as 32-bitsigned binary integers. The first operand is in bits 0-31 of general register R1; bits 32-63 of the register are unchanged. When there is an overflow, the result is obtained by allowing any carry into the sign-bit position and ignoring any carry out of the sign-bit position, and condition code 3 is set. If the fixed-point-overflow mask is one, a program interruption for fixed-point overflow occurs.

Resulting Condition Code:
0 Result zero; no overflow
1 Result less than zero: no overflow
2 Result greater than zero; no overflow
3 Overflow Program Exceptions:
Fixed-point overflow
Operation (if the high-word facility is not installed)

Add Logical High (RRF Format)

When the instruction is executed by the computer system, the second operand is added to the third operand, and the sum is placed at the first-operand location. The operands and the sum are treated as 32-bitunsigned binary integers. The first and second operands are in bits 0-31 of general registers R1 and R2, respectively; bits 32-63 of general register R1 are unchanged, and bits 32-63 of general register R2 are ignored. For ALHHHR OpCode, the third operand is in bits 0-31 of general register R3; bits 32-63 of the register are ignored. For ALHHLR Opcode the third operand is in bits 32-63 of general register R3; bits 0-31 of the register are ignored.
Resulting Condition Code:
0 Result zero; no carry
1 Result not zero; no carry
2 Result zero carry
3 Result not zero; carry
Program Exceptions:
  Operation (if the high-word facility is not installed)
ADD Logical with Signed Immediate High (RIL Format)
  When the instruction is executed by the computer system, the second operand is added to the first operand, and the sum is placed at the first-operand location. The first operand and the sum are treated as 32-bitunsigned binary integers. The second operand is treated as a 32-bit signed binary integer. The first operand is in bits 0-31 of general register R1; bits 32-63 of the register are unchanged.
Resulting Condition Code:
For ALSIH, the code is set as follows:
0 Result zero; no carry
1 Result not zero; no carry
2 Result zero; carry
3 Result not zero; carry
For ALSIHN, the code remains unchanged.
Program Exceptions:
  Operation (if the high-word facility is not installed)
Branch Relative on Count High (RI, RIL Format)
  When the instruction is executed by the computer system, A one is subtracted from the first operand, and the result is placed at the first-operand location. For BRANCH RELATIVE ON COUNT (BRCT OpCode), the first operand and result are treated as 32-bit binary integers in bits 32-63 of general register R1, with overflow ignored; bits 0-31 of the register are unchanged. For BRANCH RELATIVE ON COUNT HIGH (BRCTH OpCode), the first operand and result are treated as 32-bitbinary integers in bits 0-31 of general register R1, with overflow ignored; bits 32-63 of the register are unchanged. For BRANCH RELATIVE ON COUNT (BRCTG OpCode), the first operand and result are treated as 64-bit binary integers, with overflow ignored. When the result is zero, normal instruction sequencing proceeds with the updated instruction address. When the result is not zero, the instruction address in the current PSW is replaced by the branch address. The contents of the I2 field are a signed binary integer specifying the number of halfwords that is added to the address of the instruction to generate the branch address.
Condition Code: The code remains unchanged.
Program Exceptions:
  Operation (BRCTH, if the high-word facility is not installed)
  Programming Notes:
1. The operation is the same as that of the BRANCH ON COUNT instruction except for the means of specifying the branch address.
2. The first operand and result can be considered as either signed or unsigned binary integers since the result of a binary subtraction is the same in both cases.
3. An initial count of one results in zero, and no branching takes place; an initial count of zero results in −1 and causes branching to be executed; an initial count of −1 results in −2 and causes branching to be executed; and so on. In a loop, branching takes place each time the instruction is executed until the result is again zero.
Note that for BRCT, because of the number range, an initial count of −231 results in a positive value of 231−1, or, for BRCTG, an initial count of −263 results in a positive value of 263−1.4. When the instruction is the target of an execute type instruction, the branch is relative to the target address;
Compare High (RRE, RXY format), Compare Immediate High (RIL Format)
  When the instruction is executed by the computer system, the first operand is compared with the second operand, and the result is indicated in the condition code. The operands are treated as 32-bit signed binary integers. The first operand is in bit positions 0-31 of general register R1; bit positions 32-63 of the register are ignored. For COMPARE HIGH (CHHR OpCode), the second operand is in bit positions 0-31 of general register R2; bit positions 32-63 of the register are ignored. For COMPARE HIGH (CHLR OpCode), the second operand is in bit positions 32-63 of general register R2; bit positions 0-31 of the register are ignored. The displacement for CHF is treated as a 20-bitsigned binary integer.
Resulting Condition Code:
0 Operands equal
1 First operand low
2 First operand high
3 - - -
Program Exceptions:
  Access (operand 2 of CHF only)
  Operation (if the high-word facility is not installed)
Compare Logical (RRE, RXY Format), Compare Logical Immediate High (RIL Format)
  When the instruction is executed by the computer system, the first operand is compared with the second operand, and the result is indicated in the condition code. The operands are treated as 32-bit unsigned binary integers. The first operand is in bit positions 0-31 of general register R1; bit positions 32-63 of the register are ignored. For COMPARE LOGICAL HIGH (CLHHR OpCode), the second operand is in bit positions 0-31 of general register R2; bit positions 32-63 of the register are ignored. For COMPARE LOGICAL HIGH (CLHLR OpCode), the second operand is in bit positions 32-63 of general register R2; bit positions 0-31 of the register are ignored. The displacement for CLHF is treated as a 20-bitsigned binary integer.
Resulting Condition Code:
0 Operands equal
1 First operand low
2 First operand high
3 - - -
Program Exceptions:
  Access (operand 2 of CLHF only)
  Operation (if the high-word facility is not installed)
Load Byte High (RXY Format)
  When the instruction is executed by the computer system, the second operand is sign extended and placed at the first-operand location, The second operand is one byte in length and is treated as an eight-bit signed binary integer. The first operand is treated as a 32-bit signed binary integer in bits 0-31 of general register R1; bits 32-63 of the register are unchanged. The displacement is treated as a 20-bit signed binary integer.
Condition Code: The code remains unchanged.
Program Exceptions:
  Access (fetch, operand 2)
  Operation (if the high-word facility is not installed)
Load Halfword High (RXY Format)
  When the instruction is executed by the computer system, the second operand is sign extended and placed at the first-operand location. The second operand is two bytes in length and is treated as an 16-bit signed binary integer. The first operand is treated as a 32-bit signed. binary integer in bits 0-31 of general register R1; bits 32-63 of the register are unchanged. The displacement is treated as a 20-bit signed binary integer.
Condition Code: The code remains unchanged.
Program Exceptions:
   Access (fetch, operand 2)
   Operation (if the high-word facility is not installed)
Load High (RXY Format)
   When the instruction is executed by the computer system, the second operand is placed unchanged at the first operand location. The second operand is 32 bits, and the first operand is in bits 0-31 of general register R1; bits 32-63 of the register are unchanged. The displacement is treated as a 20-bit signed binary integer.
   Condition Code: The code remains unchanged.
Program Exceptions:
   Access (fetch, operand 2)
   Operation (if the high-word facility is not installed)
Load Logical Character High (RXY Format)
   When the instruction is executed by the computer system, the one-byte second operand is placed in bit positions 24-31 of general register R1, and zeros are placed in bit positions 0-23 of general register R1; bit positions 32-63 of general register R1 are unchanged. The displacement is treated as a 20-bit signed binary integer.
Condition Code: The code remains unchanged.
Program Exceptions:
   Access (fetch, operand 2)
   Operation (if the high-word facility is not installed)
Load Logical Halfword High (RXY Format)
   When the instruction is executed by the computer system, the two-byte second operand is placed in bit positions 16-31 of general register R1, and zeros are placed in bit positions 0-15 of general register R1; bit positions 32-63 of general register R1 are unchanged. The displacement is treated as a 20-bit signed binary integer.
Condition Code: The code remains unchanged.
Program Exceptions:
   Access (fetch, operand 2)
   Operation (if the high-word facility is not installed)
Rotate Then Insert Selected Bits High (RIE Format), Rotate Then Insert Selected Bits Low (RIE Format)
   When the instruction is executed by the computer system, the 64-bit second operand is rotated left by the number of bits specified in the fifth operand. Each bit shifted out of the leftmost bit position of the operand reenters in the rightmost bit position of the operand. The selected bits of the rotated second operand replace the contents of the corresponding bit positions of the first operand. For ROTATE THEN INSERT SELECTED BITS HIGH, the first operand is in bits 0-31 of general register R1,and bits 32-63 of the register are unchanged. For ROTATE THEN INSERT SELECTED BITS LOW, the first operand is in bits 32-63 of general register RE and bits 0-31 of the register are unchanged. The second operand remains unchanged in general register R2. For ROTATE THEN INSERT SELECTED BITS HIGH, bits 3-7 of the I3 and I4 fields (bits 19-23 and 27-31 of the instruction, respectively), with a binary zero appended on the left of each, form six-bit unsigned binary integers specifying the starting and ending bit positions (inclusive) of the selected range of bits in the first operand and in the second operand after rotation. When the ending bit position is less than the starting bit position, the range of selected bits wraps around from bit 31 to bit 0. Thus, the starting and ending bit positions of the selected range of bits are always between 0 and 31. For ROTATE THEN INSERT SELECTED BITS LOW, bits 3-7 of the I3 and I4 fields, with a binary one appended on the left of each, form six-bit unsigned binary integers specifying the starting and ending bit positions (inclusive) of the selected range of bits in the first operand and in the second operand after rotation. When the ending bit position is less than the starting bit position, the range of selected bits wraps around from bit 63 to bit 32. Thus, the starting and ending bit positions of the selected range of bits are always between 32 and 63. Bits 2-7 of the I5 field (bits 34-39 of the instruction) contain an unsigned binary integer specifying the number of bits that the second operand is rotated to the left. Bit 0 of the I4 field (bit 24 of the instruction) contains the zero-remaining-bits control (Z). The Z bit control show the remaining bits of the first operand are set(that is, those bits, if any, that are outside of the specified range). When the Z bit is zero, the remaining bits of the first operand are unchanged. When the Z bit is one, the remaining bits of the first operand are set to zeros. The immediate fields just described are as follows: Bits 0-2 of the I3 field and bits 1-2 of the I4 field (bits 10-19 and 25-20 of the instruction) are reserved and should contain zeros; otherwise, the program may not operate compatibly in the future. Bits 0-1 of the I5 field (bits 32-33 of the instruction) are ignored.
Condition Code: The code remains unchanged
Program Exceptions:
   Operation (if the high-word facility is not installed)
Programming Notes:
1. Although the bits 2-7 of the I5 field are defined to contain an unsigned binary integer specifying the number of bits that the second operand is rotated to the left, a negative value may be coded which effectively specifies a rotate-right amount.
2. The first operand is always used in its un-rotated form. When the R1 and R2 fields designate the same register, the value contained in the register is first rotated, and then the selected bits of the rotated value are inserted into the corresponding bits of the un-rotated register contents.
3. In the assembler syntax, the I5 operand containing the rotate amount is considered to be optional. When the I5 field is not coded, a rotate amount of zero is implied.
4. The I4 field contains both the zero-remaining-bits control (in bit 0) and the ending bit position value (in bits 2-7). For example, to insert bits 40-43 of register 7 into the corresponding bits of register 5 (no rotation) and zero the remaining bits in the right half of register 5, the programmer might code: The X'80' represents the zero-remaining-bits control which is added to the ending-bit position to form the I4 field. The high-level assembler (HLASM) provides alternative mnemonics for the zero-remaining bits versions of RISBHG and RISBLG in the form of RISBHGZ and RISBLHZ, respectively. The "Z" suffix to the mnemonic indicates that the specified I4 field is ORed with a value of X'80' when generating the object code. An equivalent to the example shown above using the Z-suffixed mnemonic is as follows:
5. On some models, improved performance of RISBHG and RISBLG may be realized by setting the zero-remaining-bits control to one (or using the Z mnemonic suffix).
6. Unlike ROTATE THEN INSERT SELECTEDBITS which sets the condition code, ROTATE THEN INSERT SELECTED BITS HIGH and ROTATE THEN INSERT SELECTED BITS LOW do not set the condition code.
Store Character High (RXY Format)
   When the instruction is executed by the computer system, Bits 24-31 of general register R1 are placed unchanged at the second-operand location. The second operand is one byte in length. The displacement is treated as a 20-bit signed binary integer.
Condition Code: The code remains unchanged.
Program Exceptions:
    Access (store, operand 2)
    Operation (if the high-word facility is not installed)
Store Halfword High (RXY Format)
    When the instruction is executed by the computer system. Bits 16-31 of general register R1 are placed unchanged at the second-operand location. The second operand is two bytes in length. The displacement is treated as a 20-bit signed binary integer.
Condition Code: The code remains unchanged.
Program Exceptions:
    Access (store, operand 2)
    Operation (if the high-word facility is not installed)
Store High (RXY Format)
    When the instruction is executed by the computer system, the first operand is placed unchanged at the second operand location. The first operand is in bits 0-31 of general register R1, and the second operand is 32 bits in storage. The displacement is treated as a 20-bit signed binary integer.
Condition Code: The code remains unchanged.
Program Exceptions:
    Access (store, operand 2)
    Operation (if the high-word facility is not installed)
Subtract High (RRF Format)
    When the instruction is executed by the computer system, the third operand is subtracted from the second operand, and the difference is placed at the first operand location. The operands and the difference are treated as 32-bit signed binary integers, The first and second operands are in bits 0-31 of general registers R1 and R2, respectively; bits 32-63 of general register R1 are unchanged, and bits 32-63 of general register R2 are ignored. For SHHHR OpCode, the third operand is in bits 0-31 of general register R3; bits 32-63 of the register are ignored. For SHHLR OpCode, the third operand is in bits 32-63 of general register R3; bits 0-31 of the register are ignored. When there is an overflow, the result is obtained by allowing any carry into the sign-bit position and ignoring any carry out of the sign-bit position, and condition code 3 is set. If the fixed-point-overflow mask is one, a program interruption for fixed-point overflow occurs.
Resulting Condition Code:
0 Result zero; no overflow
1 Result less than zero: no overflow
2 Result greater than zero; no overflow
3 Overflow
Program Exceptions:
    Fixed-point overflow
    Operation (if the high-word facility is not installed)
Subtract Logical High (RRF Format)
    When the instruction is executed by the computer system, the third operand is subtracted from the second operand, and the difference is placed at the first operand location. The operands and the difference are treated as 32-bit unsigned binary integers. The first and second operands are in bits 0-31 of general registers R1 and R2, respectively; bits 32-63 of general register R1 are unchanged, and bits 32-63 of general register R2 are ignored. For SLHHHR OpCode, the third operand is in bits 0-31 of general register R3; bits 32-63 of the register are ignored. For SLHHLR OpCode, the third operand is in bits 32-63 of general register R3; bits 0-31 of the register are ignored.

Figure 15:
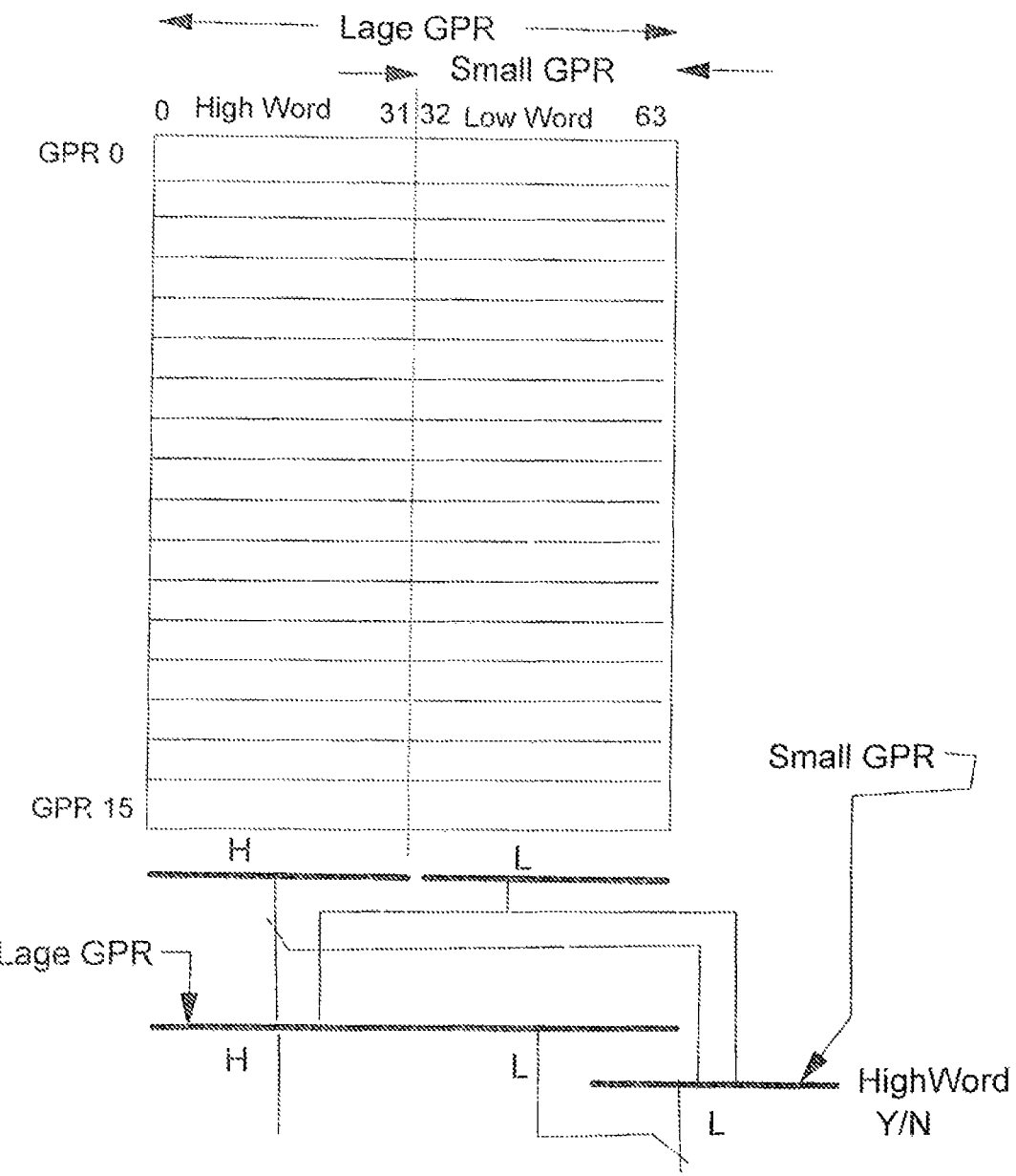
FIG. 15 depicts an example Large GPR.
Figure 16:
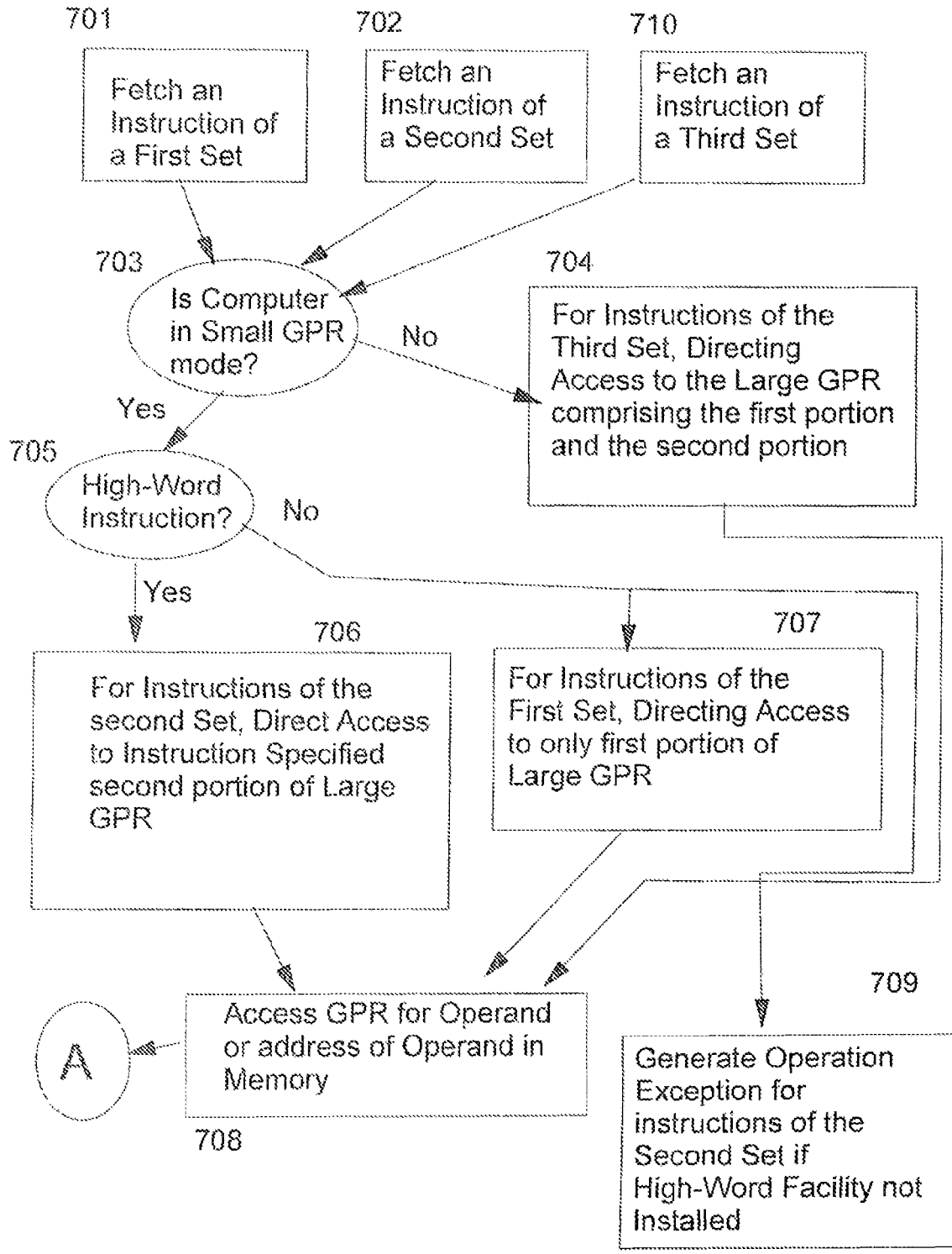
FIGS. 16-17 presents an example High-Word embodiment flow.
Figure 17:
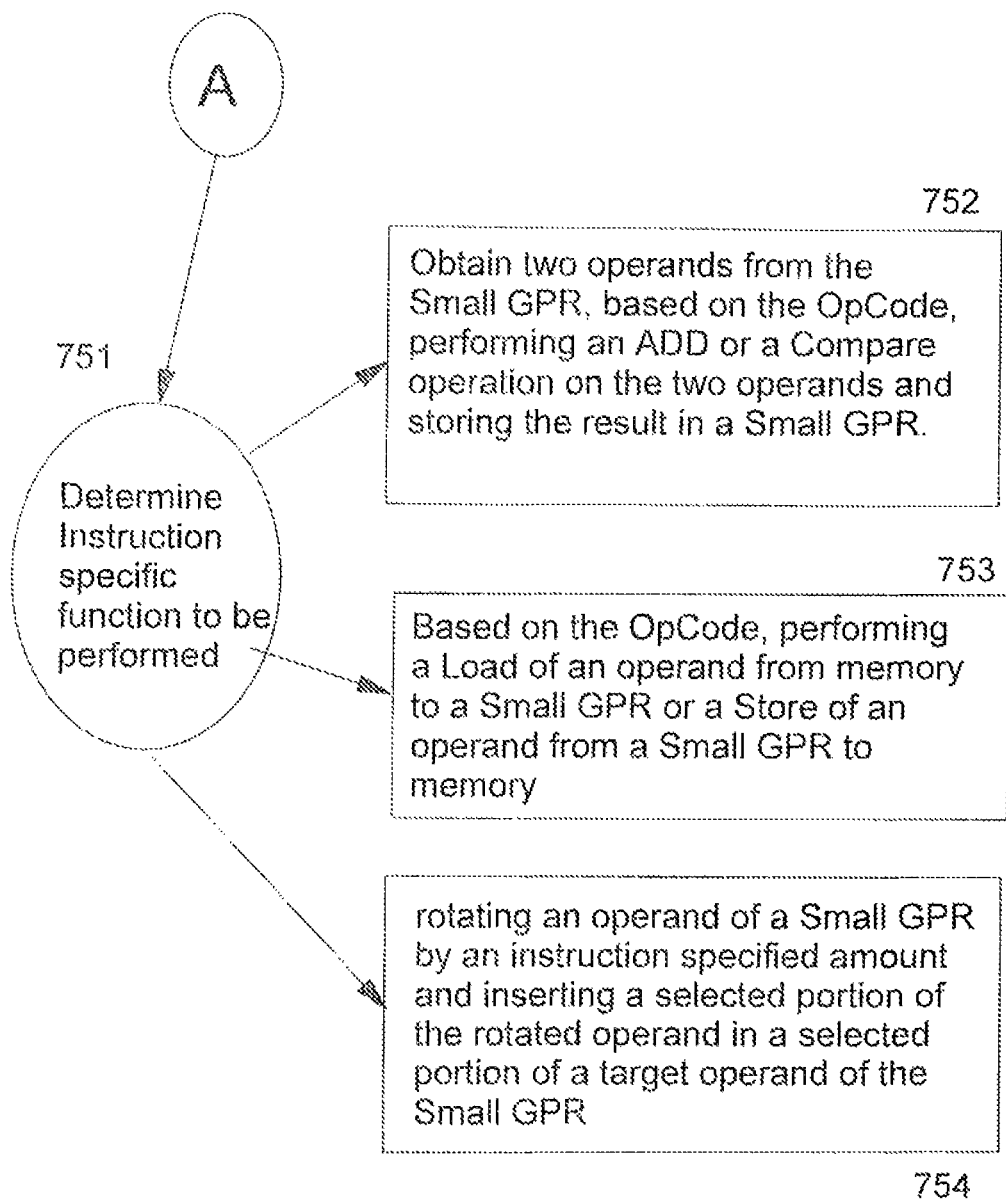

Resulting Condition Code:
0 - - -
1 Result not zero; borrow
2 Result zero; no borrow
3 Result not zero; no borrow
Program Exceptions:
    Operation (if the high-word facility is not installed)
    Referring to FIG. 15, an example General Purpose Register (GPR) is shown having 16 GPRs (each GPR comprising bits 32-63 in Small GPR mode and bits 0-63 in Large GPR mode). The effective number of General Purpose Registers (GPRs) available to instructions of a program may be extended in a computer having a first number (16) of large GPRs, each instruction comprising an opcode and one or more GPR fields for specifying corresponding GPRs, each large GPR consisting of a first portion (31-63) and a second portion (0-31). Referring to FIG. 16, a computer in fetches instructions for execution comprising instructions from either First Set 701, a Second Set 702 or a Third Set 710. The First Set only accessing a first portion of any GPR, the Second Set accessing a second portion of any GPR, the Third Set accessing the whole GPR, including the first portion and the second portion. When 703 the computer is in a small GPR mode, for example, and is executing instructions of the first set of instructions 707 for accessing first portions. the execution comprising 708 generating memory addresses for accessing memory operands based on said small GPRs or accessing small GPR operands, wherein each of said small GPRs consists of said first portion 707, when 703 the computer is in a small GOR mode, when 705 the computer is executing High-Word instructions, executing instructions 706 of a second set of instructions, the second set of instructions for accessing instruction specified second portions, wherein 708 the execution comprise generating memory addresses for accessing memory operands based on said small GPRs or accessing small GPR operands, wherein said small GPR consists of said instruction specified second portion. When 704 the computer is in a large GPR mode wherein each large GPR consists of the first portion and the second portion, the computer executes instructions of the third set of instructions, the execution comprising generating memory addresses for accessing memory operands based on said large GPRs or accessing large GPR operands, wherein each of said large GPR consists of said first portion and said second portion.
    Responsive to the computer being in a small GPR mode the computer may generate 709 an operation exception responsive to executing instructions of the second set of instructions.
    Referring to FIG. 17, the execution of the instruction of the second instruction set may perform 751 a corresponding opcode defined function based on two operands, and storing the result, the corresponding opcode defined function consisting of an ADD of two operands function, a COMPARE of two operands function or an OR of two operands function 752.
    The execution of the instruction of the second instruction set may perform a corresponding opcode defined function based on two operands, and storing the result, the corresponding opcode defined function consists of a LOAD and operand from memory function or a STORE an operand to memory function 753.
    The execution of the instruction of the second instruction set may perform a corresponding opcode defined function based on two operands, and storing the result, the corresponding opcode defined function is a ROTATE THEN INSERT SELECTED BITS function comprising rotating a source operand by an instruction specified amount, then inserting a selected portion of the rotated source operand in a selected portion of a target operand 704.

While the preferred embodiments have been illustrated and described herein, it is to be understood that the embodiments are not limited to the precise construction herein disclosed, and the right is reserved to all changes and modifications coming within the scope of the invention as defined in the appended claims.

What is claimed is:

1. A computer program product for providing access to registers available to program instructions of a program in a computer having a plurality of registers, each of said plurality of registers comprising a high order portion and a low order portion, each of said program instructions comprising an opcode specifying an operation, each of said program instructions comprising a register field for selecting any of said plurality of registers, the register field of a program instruction specifying a register of the plurality of registers for holding a corresponding register operand, the computer program product comprising a non-transitory tangible storage medium readable by a processing circuit and storing program product instructions for execution by the processing circuit for performing a method comprising:

executing, by the processing circuit, said program instructions, the executing comprising:

based on an instruction being an instruction of a first subset of said program instructions, wherein the first subset of said program instructions is configured to permit the register field to only access the high order portion of said plurality of registers, accessing, by the processing circuit, a register operand consisting of only the high order portion of a corresponding register; and based on an instruction being one of a second subset of said program instructions, wherein the second subset of said program instructions is configured to permit the register field to only access the low order portion of said registers, accessing, by the processing circuit, a register operand consisting of only the low order portion of the corresponding register;

wherein, except for the register operand portion being accessed, each instruction of the first subset of said program instructions performs an identical function as a corresponding instruction of the second subset; and wherein main storage addresses are entirely from the low order portion of a register in a first addressing mode and are formed from a combination of the high order portion and the low order portion of a register in a second addressing mode, the method further comprising:

based on determining that a high-word facility is installed, permitting execution of instructions of said first subset of instructions; and based on determining that the high-word facility is not installed, blocking execution of instruction of said first subset of instructions.

2. The computer program product according to claim 1, wherein each of said plurality of registers comprises 64 bits and the high order portion consists of 32 high order bits of the 64 bits and the low order portion consists of 32 low order bits of the 64 bits, wherein the instruction of the second subset of said instructions accesses the register operand consisting of only the low order portion.

3. The computer program product according to claim 1, wherein the accessing the register operand consisting of only the high order portion of the corresponding register comprises fetching the register operand entirely from the high order portion of the corresponding register.

4. The computer program product according to claim 1, wherein the accessing the register operand consisting of only the high order portion of the corresponding register comprises storing the register operand entirely in the high order portion of the corresponding register.

5. The computer program product according to 1, wherein the execution of the instruction of the first subset of said program instructions comprises performing a corresponding opcode defined function based on two operands, and storing a result, wherein the corresponding opcode defined function consists of any one of an ADD of two operands function or a COMPARE of two operands function.

6. The computer program product according to claim 1, wherein the execution of the instruction of the first subset of said program instructions comprises performing a corresponding opcode defined function based on two operands, and storing a result, wherein the corresponding opcode defined function consists of any one of a LOAD of an operand from memory function or a STORE of an operand to memory function.

7. The computer program product according to claim 1, wherein the execution of the instruction of the first subset of said program instructions comprises performing a corresponding opcode defined function based on two operands, and storing a result, wherein the corresponding opcode defined function is a ROTATE THEN INSERT SELECTED BITS function comprising:

rotating a source operand by an instruction specified amount; and inserting a selected portion of the rotated source operand in a selected portion of a target operand.

8. A computer system for providing access to registers available to program instructions of a program in a computer having a plurality of registers, each of said plurality of registers comprising a high order portion and a low order portion, each of said program instructions comprising an opcode specifying an operation, each of said program instructions comprising a register field for selecting any of said plurality of registers, the register field of a program instruction specifying a register of the plurality of registers for holding a corresponding register operand, the computer system comprising:

a memory;

a processor in communication with the memory, the processor comprising an instruction fetching element for fetching instructions from memory and one or more execution elements for executing fetched instructions, wherein the computer system is configured to perform a method comprising:

executing, by a processing circuit, said program instructions, the executing comprising:

based on an instruction being an instruction of a first subset of said program instructions, wherein the first subset of said program instructions is configured to permit the register field to only access the high order portion of said plurality of registers, accessing, by the processing circuit, a register operand consisting of only the high order portion of a corresponding register; and based on an instruction being one of a second subset of said program instructions, wherein the second subset of said program instructions is configured to permit the register field to only access the low order portion of said registers, accessing, by the processing circuit, a register operand consisting of only the low order portion of the corresponding register;

wherein, except for the register operand portion being accessed, each instruction of the first subset of said program instructions performs an identical function as a corresponding instruction of the second subset; and wherein main storage addresses are formed entirely from the low order portion of a register in a first addressing mode and are formed from a combination of the high order portion and the low order portion of a register in a second addressing mode, the method further comprising:

based on determining that a high-word facility is installed, permitting execution of instructions of said first subset of instructions; and based on determining that the high-word facility is not installed, blocking execution of instructions of said first subset of instructions.

9. The computer system according to claim 8, wherein each of said plurality of registers comprises 64 bits and the high order portion consists of 32 high order bits of the 64 bits and the low order portion consists of 32 low order bits of the 64 bits, wherein the instruction of the second subset of said instructions accesses the register operand consisting of only the low order portion.

10. The computer system according to claim 8, wherein the accessing the register operand consisting of only the high order portion of the corresponding register comprises fetching the register operand entirely from the high order portion of the corresponding register.

11. The computer system according to claim 8, wherein the accessing the register operand consisting of only the high order portion of the corresponding register comprises storing the register operand entirely in the high order portion of the corresponding register.

12. The computer system according to claim 8, wherein the execution of the instruction of the first subset comprises performing a corresponding opcode defined function based on two operands, and storing a result, wherein the corresponding opcode defined function consists of any one of an ADD of two operands function or a COMPARE of two operands function.

13. The computer system according to claim 8, wherein the execution of the instruction of the first subset of said program instructions comprises performing a corresponding opcode defined function based on two operands, and storing a result, wherein the corresponding opcode defined function consists of any one of a LOAD of an operand from memory function or a STORE of an operand to memory function.

14. A computer implemented method for providing access to extending an effective number of registers available to program instructions of a program in a computer having a plurality of registers, each of said plurality of registers comprising a high order portion and a low order portion, each of said program instructions comprising an opcode specifying an operation, each of said program instructions comprising a register field for selecting any of said plurality of registers, the register field of a program instruction specifying a register of the plurality of registers for holding a corresponding register operand, the method comprising:

executing, by a processing circuit, said program instructions, the executing comprising:

based on an instruction being an instruction of a first subset of said program instructions, wherein the first subset of said program instructions is configured to permit the register field to only access the high order portion of said plurality of registers, accessing, by the processing circuit, a register operand consisting of only the high order portion of a corresponding register; and based on an instruction being one of a second subset of said program instructions, wherein the second subset of said program instructions is configured to permit the register field to only access the low order portion of said registers, accessing, by the processing circuit, a register operand consisting of only the low order portion of the corresponding register;

wherein, except for the register operand portion being accessed, each instruction of the first subset of said program instructions performs an identical function as a corresponding instruction of the second subset; and wherein main storage addresses are formed entirely from the low order portion of a register in a first addressing mode and are formed from a combination of the high order portion and the low order portion of a register in a second addressing mode, the method further comprising:

based on determining that a high-word facility is installed, permitting execution of instructions of said first subset of instructions; and based on determining that the high-word facility is not installed, blocking execution of instructions of said first subset of instructions.

15. The computer implemented method according to claim 14, wherein each of said plurality of registers comprises 64 bits and the high order portion consists of 32 high order bits of the 64 bits and the low order portion consists of 32 low order bits of the 64 bits, wherein the instruction of the second subset of said instructions accesses the register operand consisting of only the low order portion.

16. The computer implemented method according to claim 14, wherein the accessing the register operand consisting of only the high order portion of the corresponding register comprises fetching the register operand entirely from the high order portion of the corresponding register.

17. The computer implemented method according to claim 14, wherein the accessing the register operand consisting of only the high order portion of the corresponding register comprises storing the register operand entirely in the high order portion of the corresponding register.

18. The computer implemented method according to claim 14, wherein the execution of the instruction of the first subset of said program instructions comprises performing a corresponding opcode defined function based on two operands, and storing a result, wherein the corresponding opcode defined function consists of any one of an ADD of two operands function or a COMPARE of two operands function.

19. The computer implemented method according to claim 14, wherein the execution of the instruction of the first subset of said program instructions comprises performing a corresponding opcode defined function based on two operands, and storing a result, wherein the corresponding opcode defined function consists of any one of a LOAD of an operand from memory function or a STORE of an operand to memory function.

* * * * *